US012768169B2

(12) United States Patent
Crossman et al.

(10) Patent No.: US 12,768,169 B2
(45) Date of Patent: Oct. 20, 2026

(54) GUTTER MESH INSTALLATION

(71) Applicant: Rain Harvesting Pty Ltd, Milton (AU)

(72) Inventors: Shaun Crossman, Milton (AU); Anton Lee See, Milton (AU)

(73) Assignee: RAIN HARVESTING PTY LTD, Milton (AU)

(*) Notice: Subject to any disclaimer, the term of this patent is extended or adjusted under 35 U.S.C. 154(b) by 152 days.

(21) Appl. No.: 18/836,478

(22) PCT Filed: Feb. 6, 2023

(86) PCT No.: PCT/AU2023/050074
§ 371 (c)(1),
(2) Date: Aug. 7, 2024

(87) PCT Pub. No.: WO2023/150823
PCT Pub. Date: Aug. 17, 2023

(65) Prior Publication Data

US 2025/0137258 A1 May 1, 2025

(30) Foreign Application Priority Data

Feb. 8, 2022 (AU) ................................ 2022900250

(51) Int. Cl.
*E04D 13/076* (2006.01)
*F16M 13/02* (2006.01)

(52) U.S. Cl.
CPC ........... *E04D 13/076* (2013.01); *F16M 13/02* (2013.01)

(58) Field of Classification Search
CPC . E04D 13/076; E04D 13/0725; E04D 13/064; E04D 1/30; Y10T 24/344
See application file for complete search history.

(56) References Cited

U.S. PATENT DOCUMENTS 2,805,632 A 9/1957 Couture
3,297,285 A * 1/1967 Simmons .............. E04D 13/076 248/48.1
5,729,931 A * 3/1998 Wade .................... E04D 13/076 52/12

(Continued)

FOREIGN PATENT DOCUMENTS

JP 2000096786 4/2000
JP 2002004521 1/2002

OTHER PUBLICATIONS

International Search Report Issued Mar. 17, 2023 for Corresponding PCT/AU2023/050074.

*Primary Examiner* — Brian E Glessner
*Assistant Examiner* — Daniel J Kenny
(74) *Attorney, Agent, or Firm* — DUANE MORRIS LLP

(57) ABSTRACT

The present invention resides in a method for installing gutter mesh to a gutter of a roof, the gutter having an outer edge. The method comprises locating one or more clips on an outer edge of the gutter, wherein the one or more clips including a projection and a landing area for receiving part of the gutter mesh. After placing the gutter mesh such that parts of the gutter mesh overlie the landing areas of the one or more clips and an inner part of the gutter mesh overlies part of the roof, at least one retainer may be placed over one or more of the one or more clips, securing the gutter mesh to the gutter. An inner retainer may also be applied to fix an inner part of the gutter mesh to the roof.

20 Claims, 38 Drawing Sheets

(56) References Cited

U.S. PATENT DOCUMENTS

| | | | | |
|---|---|---|---|---|
| 9,021,747 | B2 * | 5/2015 | Lenney | E04D 13/076 52/12 |
| 2012/0174494 | A1 | 7/2012 | Ollison, IV | |
| 2014/0069027 | A1 | 3/2014 | Reese | |

* cited by examiner

GUTTER MESH INSTALLATION

CROSS REFERENCE TO RELATED APPLICATIONS

This application is a National Stage Application, filed under 35 U.S.C. 371, of International Patent Application No. PCT/AU2023/050074, filed on Feb. 6, 2023, which claims priority to Australian Patent Application No. 2022900250 filed on Feb. 8, 2022, contents of both of which are incorporated herein by reference in their entireties.

TECHNICAL FIELD

The present invention relates to a method for installing gutter mesh, a system for installing gutter mesh and parts for the system for installing gutter mesh.

BACKGROUND ART

A roof gutter (also referred to as “guttering”) is an upwardly open channel that extends along below the outer edges of downwardly and outwardly sloping sections roof, e.g. on houses, buildings and the like. The purpose of the roof gutter is to catch water that flows off the roof during periods of rainfall. The roof gutter will typically have outlets therein at spaced locations to allow water that is collected off the roof to then flow along and out of the gutter, for example into downpipes leading to a storage tank, or to a stormwater drain or the like.

It is common for roof gutters to be provided with a mesh-type covering, commonly referred to as “gutter mesh”. The purpose of the mesh is to prevent leaves, sticks and other debris from entering the roof gutter. More specifically, the openings in the mesh allow water flowing off the roof to still pass through the mesh and into the roof gutter, as desired. However, the openings in the mesh are sufficiently small to prevent larger sticks, leaves and other debris from entering the roof gutter. There are many reasons why it is important to prevent leaves, sticks and the like from entering the roof gutter. For example, if such debris is allowed to enter the roof gutter (e.g. as it may be if gutter mesh is not installed) the debris can build up in the roof gutter, clogging the roof gutter and preventing water from flowing properly along and out of the roof gutter (the water may instead spill over the sides of the roof gutter and become lost). Also, leaves, sticks and other organic debris which builds up in the roof gutter can pose a very serious fire risk, because this organic matter is highly flammable and therefore, in the event of a nearby fire (or bushfire), embers may land in and cause this debris in the roof gutter to ignite. And it may then be very easy for the fire to spread from the burning debris in the roof gutter into the roof cavity of the house or building. Furthermore, organic leaves, sticks and other leaf matter that collects in a roof gutter can rot/decompose therein, and this can lead to accelerated rusting or corrosion of the metal roof gutter.

Although gutter mesh has been used for a long period of time, installation of gutter mesh still presents problems. Gutter mesh is fitted to the edges of the roof of the building, which requires that the installation person be positioned at height during the installation process. This introduces Occupational Health & Safety issues and may require the use of fall arrestors or other safety devices, thereby increasing the time and cost of installation. Some gutter mesh requires that fixing screws be screwed into the roof, again increasing the difficulty of installation and introducing a risk of leakage through the roof around the screws. Some gutter mesh is installed by screwing the gutter-side edge of the mesh to the gutter. Most gutters have rounded lips at the outer edge, and it can be difficult to accurately position and insert screws into those rounded lips. Accordingly, an improved method and system for installing gutter mesh remains desirable.

It will be clearly understood that, if a prior art publication is referred to herein, this reference does not constitute an admission that the publication forms part of the common general knowledge in the art in Australia or in any other country.

SUMMARY OF INVENTION

The present invention is directed to a method for installing gutter mesh, and a system for installing gutter mesh, and parts for use in the system and method, which may at least partially overcome at least one of the abovementioned disadvantages or provide the consumer with a useful or commercial choice.

With the foregoing in view, the present invention in one form, resides broadly in a method for installing gutter mesh to a gutter of a roof, the gutter having an outer edge, the method comprising:

- locating one or more clips on an outer edge of the gutter, the one more clips including a projection and a landing area for receiving part of the gutter mesh,
- placing the gutter mesh such that parts of the gutter mesh overlie the landing areas of the one or more clips and an inner part of the gutter mesh overlies part of the roof,
- placing at least one retainer over one or more of the one or more clips, and
- applying an inner retainer to fix an inner part of the gutter mesh to the roof.

In order to provide clarity of nomenclature used in this specification, the term “outward” or “outwardly” will be used to refer to locations that are positioned relatively closer to the gutter than other parts of the specified component, and the terms “inward” or “inwardly” will be used to refer to locations that are positioned relatively further away from the gutter than other parts of the specified component. For example, if a component is located on the roof, the outer side of that component is the side that is located closest to the gutter and the inner side of that component id the side located most distant from the gutter.

In one embodiment, the projection of the clip comprises an upstanding projection. In another embodiment, the clip comprises an outwardly extending projection.

In one embodiment, the projection of the clip passes through an aperture in the mesh when the mesh is fitted to the clip. In one embodiment, the projection comprises an upstanding projection that is located away from an outer edge of the clip.

The clip is designed to attach to the outer edge of the gutter. In one embodiment, the clip is adapted to be attached to the outer edge of the gutter without requiring any tools. In this regard, an installer can simply hold the clip in his/her hand and attach the clip to the gutter edge by pushing it onto the edge of the gutter.

Persons skilled in the art will appreciate that nearly all gutters or guttering have an outer edge that comprises a lip. The lip is typically a rounded lip. Accordingly, in most embodiments, the clip is shaped to attach to a rounded lip of the gutter.

In one embodiment, the clip has at least one leg. In some embodiments, the clip has a plurality of legs. In use, the leg or legs will normally be positioned on an inside part of the gutter. The leg or legs may be a resilient leg or legs, or the leg or legs may be a flexible and resilient leg or legs.

In one embodiment, the clip has a biasing means to bias the leg or legs away from the gutter. The biasing means may comprise a shaped arm or a projection extending away from the leg towards the gutter. The biasing means may contact part of the wall of the gutter to thereby bias the at least one leg away from the gutter. The biasing means may be resilient, or it may be flexible and resilient.

The clip may have an arm or a projection that, in use, has a region that is located under part of the lip of the gutter and abuts part of the lip of the gutter.

In some embodiments, the clip has a downwardly extending outer wall that, in use, is located externally to the lip of the gutter and abuts the lip when the clip is fitted to the gutter.

The landing area of the clip may be a generally flat region of the clip. In some embodiments, the landing area of the clip may be located inwardly of the projection of the clip. In other embodiments, the landing area may be located both inwardly of and outwardly of the projection of the clip.

The clip may have one or more barbs that engage with openings in the mesh. The one or more barbs may be located on the landing area of the clip. The one or more barbs may comprise barbs that, in use, extend upwardly and outwardly.

In one embodiment, the projection of the clip has one or more teeth or one or more serrations thereon. The one or more teeth may be formed as a plurality of spaced ridges. The purpose of the one or more teeth or one or more serrations will be described hereunder.

The clip is suitably be made from a resilient material, or from a flexible and resilient material. In one embodiment, the clip is made from a flexible plastic material. In another embodiment, the clip is made from a flexible metal material. In a further embodiment, the clip may be made from metal and the projection made from a plastic material.

In one embodiment, the projection of the clip is integrally formed with the clip. In another embodiment, the projection of the clip is formed from a separate piece to the remainder of the clip.

In one embodiment, the clip may be fitted to the gutter such that the clip is held in a fixed vertical position and a fixed lateral position relative to outer wall of the gutter. However, the clip can slide along the gutter, thereby enabling fine tuning of the position of the clip on the gutter to be easily achieved.

In some embodiments, in order to fit the clip to the gutter, the clip is simply located relative to the outlet of the gutter and pushed downwardly. The biasing means biases the leg or legs of the clip away from the wall of the gutter, the arm or projection comes to rest in abutment with and underneath part of the lip of the gutter and the outer wall of the gutter overlies the outer side of the lip of the gutter. This holds the clip in place, in that the clip cannot be easily removed from the gutter by lifting it upwardly and the clip cannot be moved downwardly as an underneath part of the landing area of the clip is in abutment with the lip of the gutter. However, the clip can still slide along or move longitudinally along the gutter to enable fine tuning of the placement or location of the clip.

In one embodiment, the clip comprises an elongated clip having a plurality of projections, such as a plurality of upstanding projections. In another embodiment, the clip comprises a clip of short length and having an upstanding projection, such as one upstanding projection.

The gutter mesh that is used in the present invention may be any conventional or known gutter mesh. Most gutter meshes comprise an expanded mesh. The gutter mesh is suitably made from metal.

In one embodiment of the method of the present invention, a plurality of clips affixed to the gutter, each of the plurality of clips having an upstanding projection that is adapted to be inserted through apertures in the mesh. The mesh is then installed such that the outer edge of the mesh is located outwardly of the projection and the projection of each clip extends through an aperture in the mesh. Each clip then has a retainer applied thereto and the inner edge of the mesh is affixed to the roof.

In another embodiment, the method of the present invention further comprises positioning a strip over one or more of the one or more clips and over a part of the gutter mesh, the strip comprising a plurality of spaced apertures sized to fit over the projection of the gutter clip, the strip further comprising a plurality of projections adapted to engage with openings of the gutter mesh, and placing at least one retainer over at least part of the strip, the retainer fixing the strip in place.

In one embodiment of the method of the present invention, a plurality of clips are fitted to the gutter, each of the plurality of clips having an upstanding projection. In this embodiment, the gutter mesh may be positioned such that an outer edge of the gutter mesh abuts against the upstanding projections of the clips. The skilled person will understand that the gutter mesh extends inwardly so that it overlies a valley of the gutter and also overlies part of the roof.

In some embodiments of the present invention, the strip is used to hold the gutter mesh in place relative to the clips and relative to the edge of the gutter.

In one embodiment, the strip comprises an elongated strip. In one embodiment, the strip comprises a flat strip. In another embodiment, the strip comprises a strip having an L-shaped cross-section.

The strip has a plurality of apertures. In order to fit the strip, the strip is positioned so that one or more of the apertures are aligned with one or more of the projections of the one or more clips. The strip is then moved along the one or more projections towards the gutter so that the one or more projections are inserted through the selected one or more apertures of the strip. In embodiments where the clip has an upstanding projection, the strip is pushed down over the upstanding projections. If the apertures of the strip do not properly align with one or more projections of the clips, it is relatively simple to adjust the position of one of the clips by sliding that clip along the gutter to bring the projection of that clip into alignment with an aperture of the strip.

The strip has a plurality of projections adapted to engage with openings of the gutter mesh. The plurality of projections may comprise downwardly and outwardly extending projections. The plurality of projections may comprise a plurality of barbs. The plurality of projections may be formed by punching out regions of the strip. The plurality of projections extend into or through openings in the gutter mesh and engage with the material that defines the openings in the gutter mesh. This assists in preventing inward movement of the gutter mesh relative to the strip.

The strip is suitably made from a metal material, such as aluminium. Aluminium is advantageous in that many gutter meshes are made from aluminium and using an aluminium strip will avoid galvanic corrosion. Further, aluminium is corrosion resistant. It will be appreciated that other metals or even rigid plastics may be used to manufacture the strip.

It will be appreciated that a preferred embodiment of the present invention first positions the gutter mesh on the landing areas of the clips and the strip is then fitted over the top of the clips and the gutter mesh. However, it will also be appreciated that there could be embodiments of the present invention where the strip is fitted to the clips and then the gutter mesh is positioned on top of the strip.

Once the gutter mesh and strip have been fitted, the retainer is fitted to thereby retain and effectively fix the outer region of the gutter mesh in position.

In one embodiment, the retainer comprises a body having an opening that fits over the projection of the clip. The retainer may include locking means for locking the retainer to the projection so that the retainer is held in position relative to the clip. As the retainer overlies the gutter mesh and the strip, the retainer also holds the gutter mesh and the strip in position. In one embodiment, the locking means of the retainer comprises one or more teeth or serrations located in the opening of the body, the one or more teeth or serrations engaging with the one or more teeth or serrations of the projection of the clip, wearing a ratchet arrangement between the retainer and the projection of the clip is obtained wherein the retainer can be easily fitted to the projection and is then retained on the projection. The projection of the clip and the locking means of the retainer form a similar locking or engagement arrangement as is found on cable ties. The one or more teeth or serrations on the retainer may each have a generally horizontal upper edge and a sloping lower edge.

In one embodiment, the teeth or serrations of the locking means are located on a flexible leg that is adapted to be moved out of engagement with the teeth or serrations of the projections to enable the retainer to be removed. In this regard, it may be desirable to remove the retainer so that maintenance or replacement of one or more components of the gutter mesh fitting system can take place. Again, this arrangement may be similar to an arrangement use on cable ties that allow for selective unlocking of the cable tie.

The body of the retainer may have a region that overlies the part of the gutter mesh that is positioned on the landing area of the clip.

The body of the retainer may have a region that overlies an outer part of the clip. In one embodiment, the body of the mesh has a downwardly extending outer wall that overlies an outer part of the clip.

In one embodiment, the retainer comprises a locking body or a locking plate.

In one embodiment of the method of the present invention, a plurality of clips are applied to gutter, with the plurality of clips being spaced from each other and extending along a substantial length of the gutter, one or more strips of gutter mesh are then positioned so that parts of the gutter mesh lie on the landing areas of the clips, a plurality of strips are positioned over the projections of the clips so that the retainers overlie the landing areas of the clips and part of the outer edge of the gutter mesh, and a retainer is applied to the projection of each clip. Each strip is suitably located close to or abutment with an adjacent strip. At this stage, the outer edge of the gutter mesh is firmly fixed in position relative to the cutter.

If desired for aesthetic reasons, a part of the projection of the clips may then be cut off. In particular, the part of the projection of the clips that extends above or beyond the retainer fitted to the clip may be cut off. The part of the projection may be cut off using scissors, pliers or other common cutting instruments.

To complete the installation, it is necessary to fix the inner edge of the gutter mesh to the roof. In one embodiment, the inner edge of the gutter mesh is affixed to the roof without requiring formation of holes in the roof.

In one embodiment, the inner retainer comprises an adhesive or an adhesive tape.

In another embodiment that is suitable for use with flat roofs, such as roofs comprising flat tiles or slate, the inner retainer comprises a strip having a region to overlie an inner edge of the gutter mesh, the strip having an adhesive or an adhesive that, in use, is applied to the inner edge of the gutter mesh. In one embodiment, the adhesive or adhesive tape extends through openings in the gutter mesh and also adheres to the roof underlying the inner edge of the gutter mesh.

In another embodiment, the strip comprises a first region as described immediately above and a second region located inwardly from the first region, the second region overlying the roof adjacent to the inner edge of the gutter mesh. In one embodiment, the second region is also provided with an adhesive or adhesive tape to enable the second region to be affixed to the roof. In this embodiment, the first region of the strip may be made from a metal or a relatively rigid material and the second region of the strip may be made from a rubber or a flexible or flexible and resilient material. In one embodiment, the first region of the strip and the second region of the strip comprise two separate pieces that are joined together.

In one embodiment, the first region of the strip is provided with an adhesive tape and the second region of the strip is provided with an adhesive tape. The adhesive tape is suitably provided with a peel layer or a release layer that can be removed just prior to fixing the strip to the roof.

In one embodiment, the adhesive may comprise VHB tape available from 3M. VHB tape is a high bond, double sided tape.

In yet another embodiment for use with corrugated roofs, the inner retainer comprises an inner region having a profile shaped to match the profile of the roof and an outer region that is generally flat. Both the inner and outer regions may have adhesive or adhesive tape thereon. In order to fit the inner retainer to the roof, the adhesive or adhesive tape is exposed, for example, by removing a peel layer or release layer, and the inner region is fixed to the corrugated region of the roof and the outer region is fixed to the gutter mesh. Desirably, the adhesive or adhesive tape of the outer region extends through the openings of the gutter mesh and attaches to at least peaks of the corrugated roof underneath the gutter mesh.

In some embodiments, the inner retainer comprises a plurality of separate inner retainers, with adjacent inner retainers overlapping each other at the edges. In this manner, the inner edge of the gutter mesh can be firmly affixed to the roof.

In another embodiment, the inner retainer may comprise an outer region having a plurality of projections or barbs that engage with apertures in the mesh and an inner region comprising an adhesive or adhesive tape to adhere the inner region to the roof.

In a second aspect, the present invention provides a system for installing gutter mesh to a gutter of the roof, the gutter having outer edge, the system comprising a plurality of clips for fitting to an outer edge of the gutter, the clips including a projection and a landing area for receiving part of the gutter mesh, a plurality of retainers for positioning over at least part of the clip, and one or more inner retainers to fix an inner part of the gutter mesh to the roof.

In one embodiment, the system further includes a strip for positioning over one or more of the clips and over a part of the gutter mesh, the strip further comprising a plurality of projections adapted to engage with openings of the gutter mesh.

In another embodiment, the system further includes a strip for positioning over one or more of the clips and over a part of the gutter mesh, the strip comprising a plurality of spaced apertures sized to fit over the projection of the gutter clip, the strip further comprising a plurality of projections adapted to engage with openings of the gutter mesh, In embodiments of the system of second aspect of the present invention, the clips, the strip, the retainer and the inner retainer may be as described with reference to the first aspect of the present invention.

The system may be provided as a kit of parts. Each separate component of the system may be sold separately, or together with one or more other components of the system.

In a further aspect, the system of the present invention may omit the one or more inner retainers. In this aspect, the present invention provides a system for affixing an outer edge of gutter mesh to a gutter of the roof, the gutter having an outer edge, the system comprising a plurality of clips for fitting to an outer edge of the gutter, the clips including a projection and a landing area for receiving part of the gutter mesh, and a plurality of retainers for positioning over at least part of the clip.

In a further aspect, the present invention relates to the clip as described herein.

In a further aspect, the present invention relates to the strip as described herein.

In a further aspect, the present invention relates to the retainer as described herein.

In a further aspect, the present invention relates to the inner retainer as described herein.

In yet another embodiment, the inner retainer comprises adhesive tape on an inner region and further comprises one or more apertures on an outer region of the inner retainer, the outer region of the inner retainer configured to be positioned over the inner region of the gutter mesh. The adhesive tape is configured to affix the inner region of the inner retainer to the roof. Optionally, the one or more apertures are sized to suit a nozzle of a liquid adhesive source for application of a liquid adhesive. Further optionally, the liquid adhesive is a silicone, polyurethane, sealant, or suitable liquid adhesive applied by a caulking gun, sealant gun, or suitable liquid adhesive applicator.

In yet another embodiment, the inner retainer comprises a plurality of tooth shaped profiles on the inner region of the inner retainer, the plurality of tooth shaped profiles configured to engage with the troughs of a corrugated roof. The inner retainer comprises adhesive tape positioned between the inner region and the outer region, and further comprises one or more apertures on the outer region of the inner retainer, the outer region of the inner retainer configured to be positioned over the inner region of the gutter mesh. The adhesive tape is configured to affix the inner region of the inner retainer to the roof. Optionally, the one or more apertures are sized to suit a nozzle of a liquid adhesive source for application of a liquid adhesive. Further optionally, the liquid adhesive is a silicone, polyurethane, sealant, or suitable liquid adhesive applied by a caulking gun, sealant gun, or suitable liquid adhesive applicator.

Optionally, the inner retainer for the above embodiments further comprises a raised projection on which the one or more aperture is located. Further optionally, the raised projection is a frustoconical shape with the aperture centrally positioned.

For brevity of description, reference to features of the clip, the strip, the retainer and the inner retainer, may be as described with reference to the first aspect of the present invention, and this description will not be repeated further.

In preferred embodiments of the present invention, the method and system of the present invention allow for easy fitment of gutter mesh to a gutter and roof. It is not necessary to drill any holes in either the gutter or the roof. The clips are easy to fit to the outer edge or lip of the gutter and the clips can slide along the outer edge or lip of the gutter to enable easy adjustment of the positioning and location of the clips. The gutter mesh can be laid on the landing areas of the clips and the barbs of the clips prevent or minimise movement of the gutter mesh laterally away from the clips. The strips are then applied, with the upstanding projections of the clips being inserted through apertures of the strips. Consequently, this substantially prevents relative lateral and longitudinal movement between the strips and the clips. The barbs of the strip engage with openings in the mesh to also prevent the mesh being moved inwardly relative to the strips. The retainers are then fitted to the clips to lock the mesh and strips in position. The inner retainers can be fitted by peeling off the peel layer or release layer and adhering the inner retainers to the inner edge or inner region of the gutter mesh and the roof. The inner retainers can be further secured by application of a liquid adhesive through the one or more apertures, wherein the liquid adhesive permeates the gutter mesh and provides a bond between the roof, the gutter mesh, and the inner retainer.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

In FIG. 31 the gutter mesh has been fully installed;

DESCRIPTION OF EMBODIMENTS

Figure 1:
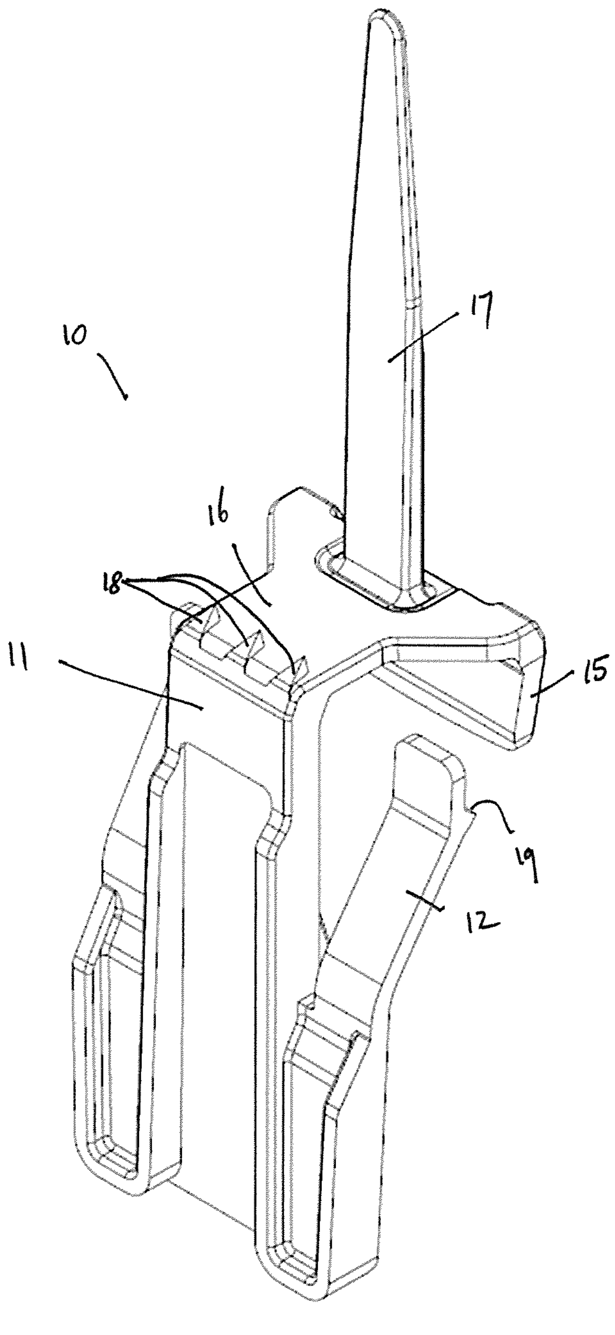
FIG. 1 shows a perspective view of a clip in accordance with one embodiment of the present invention that is suitable for use in installing gutter mesh in accordance with an embodiment of the present invention.
Figure 2:
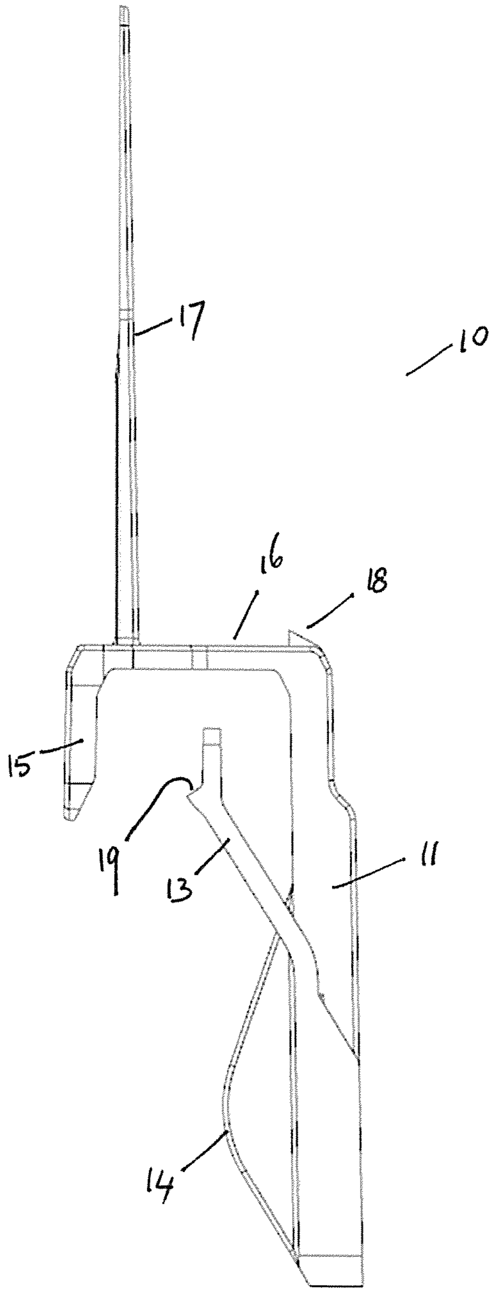
FIG. 2 shows a side view of the clip shown in FIG. 1.
Figure 3:
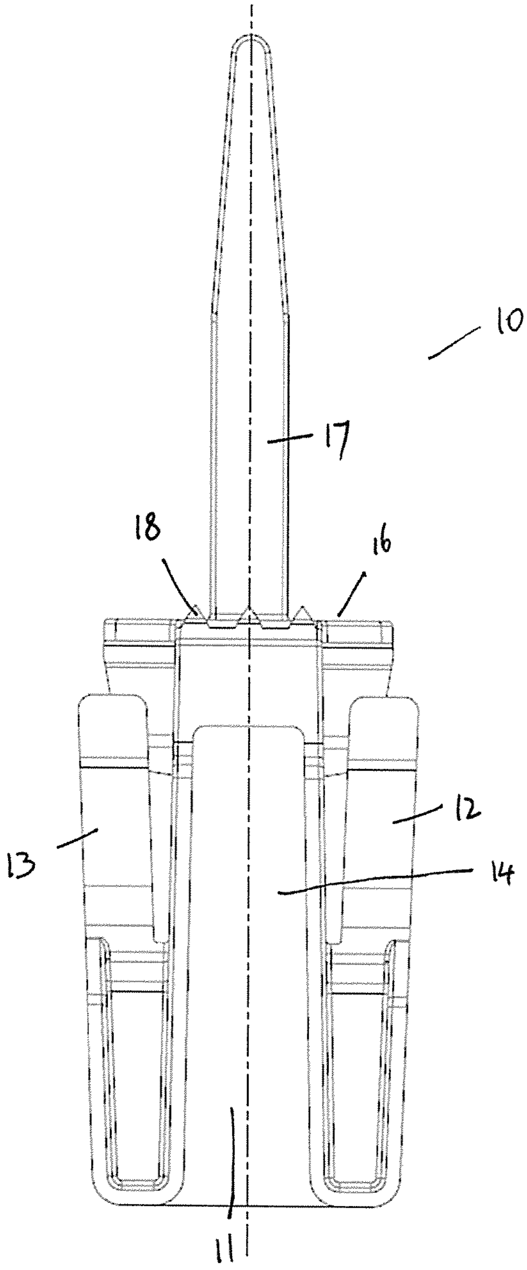
FIG. 3 shows a front view of the clip shown in FIG. 1.

FIGS. 1 to 3 show various views of a clip 10 in accordance with an embodiment of the present invention. The clip 10 has a downward extending leg 11 and two arms 12, 13. As can be seen, arms 12, 13 extend upwardly and slope towards a rear wall 15. The clip 10 also has a biasing means 14, in the form of a bowed, resilient member attached at either end to leg 11. The clip 10 also includes a landing area 16, in the form of a generally flat region. An upwardly extending projection 17 is located towards the rear of the landing area 16. A plurality of barbs 18 are located at the front part of the landing area 16. It is also noted that the arms 12, 13 each have an abutment region 19 that is formed by a projecting surface on the arms 12, 13.

The clip 10 is made from plastic material such that the clip has a degree of flexibility and resilience. In particular, the arms 12, 13 and the biasing means 14 are flexible and resilient. Operation and use of the clip 10 will be described hereunder.

Figure 4:
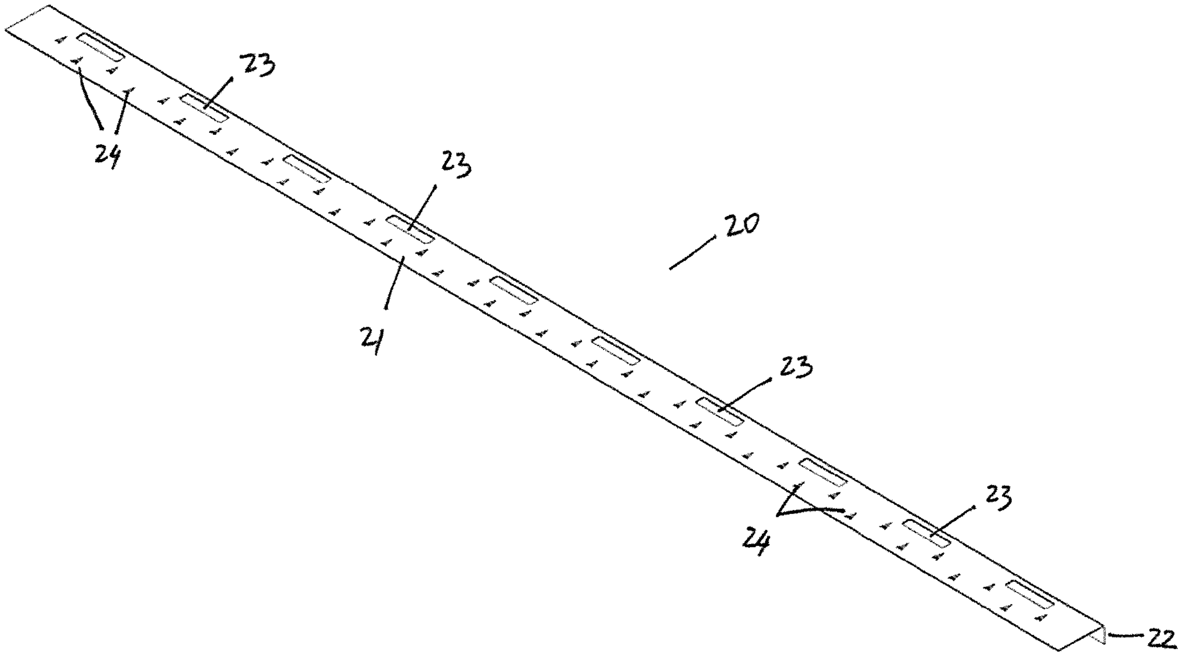
FIG. 4 shows a perspective view of a strip in accordance with one embodiment of the present invention that is suitable for use in installing gutter mesh in accordance with an embodiment of the present invention.
Figure 5:
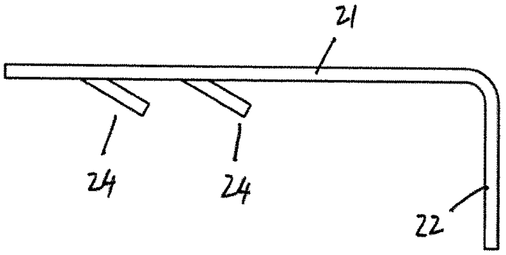
FIG. 5 is an end view of the strip shown in FIG. 4.
Figure 6:
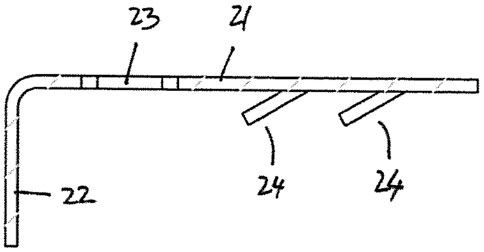
FIG. 6 is a cross sectional end view of the strip shown in FIG. 4.

FIGS. 4 to 6 show various views of a strip 20 in accordance with an embodiment of the present invention. The strip 20 is in the form of an L-shaped strip having a top surface 21 and a side wall 22. The top surface 21 has a plurality of apertures 23 formed therein. The apertures 23 have generally rectangular openings that are slightly larger than the base of the upwardly extending projection 17 of the clip 10. A plurality of barbs 24 are formed in the top 21 of the strip 20. Each barb 24 may be suitably formed by punching out a triangular portion of metal whilst leaving the base of the triangular punch-out attached to the strip 20. This results in downwardly and outwardly extending barbs 24 being formed. Operation and use of the strip 20 will be described hereunder.

Figure 7:
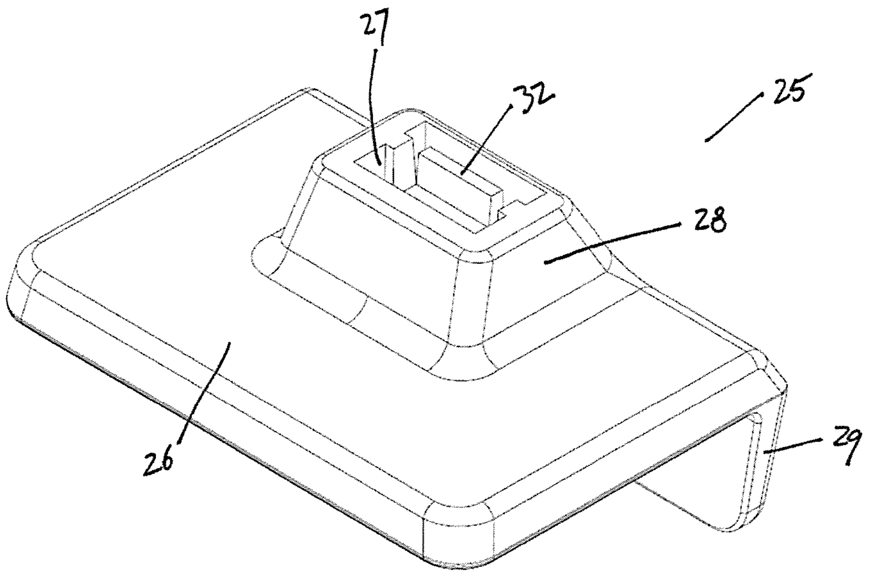
FIG. 7 is a perspective view of a retainer in accordance with one embodiment of the present invention that is suitable for use in installing gutter mesh in accordance with an embodiment of the present invention.
Figure 8:
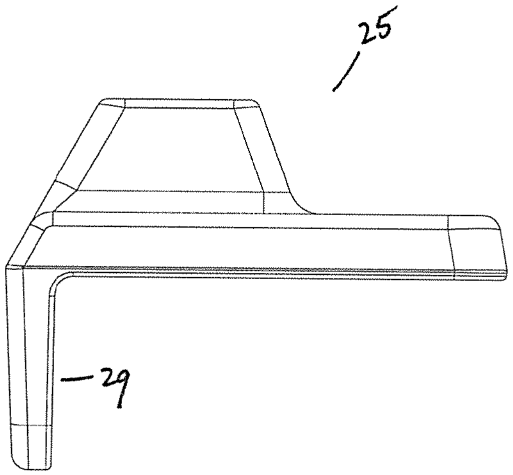
FIG. 8 shows a side view of the retainer shown in FIG. 7.
Figure 9:
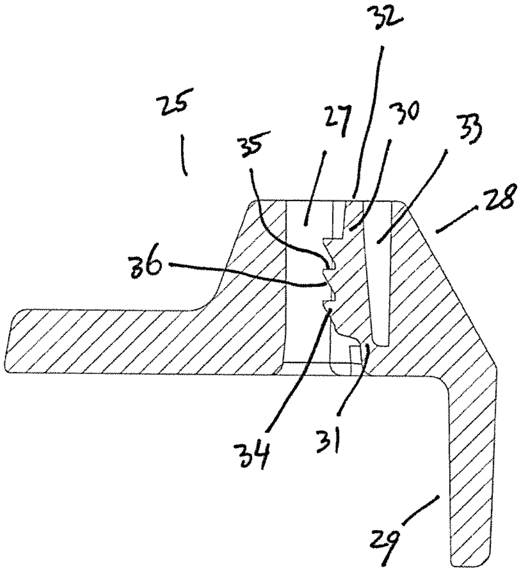
FIG. 9 shows a cross sectional side view of the retainer shown in FIG. 7.

FIGS. 7 to 9 show a retainer 25 in accordance with one embodiment of the present invention. The retainer 25 has a body 26. An opening 27 is formed in the body. In particular, a boss 28 extends upwardly from a top surface of the body 26 and the opening 27 is formed in the boss 28. The retainer 25 also has a downwardly extending side wall 29.

Figure 20:
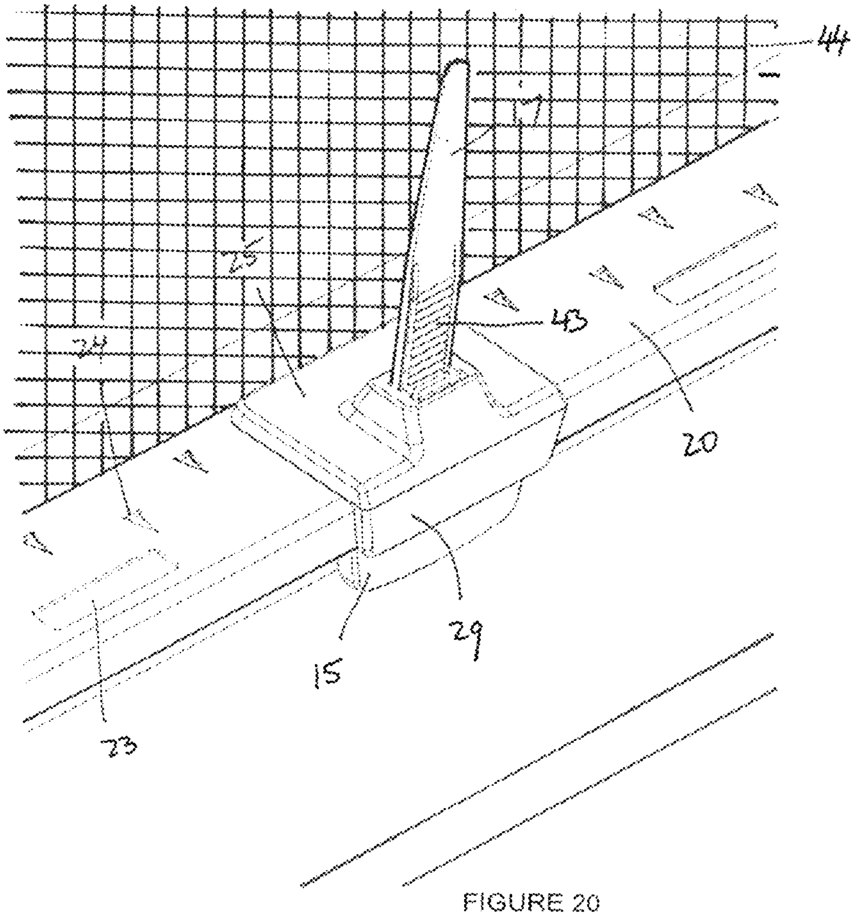
FIG. 20 is a perspective view of the retainer being mounted to the clip.
Figure 21:
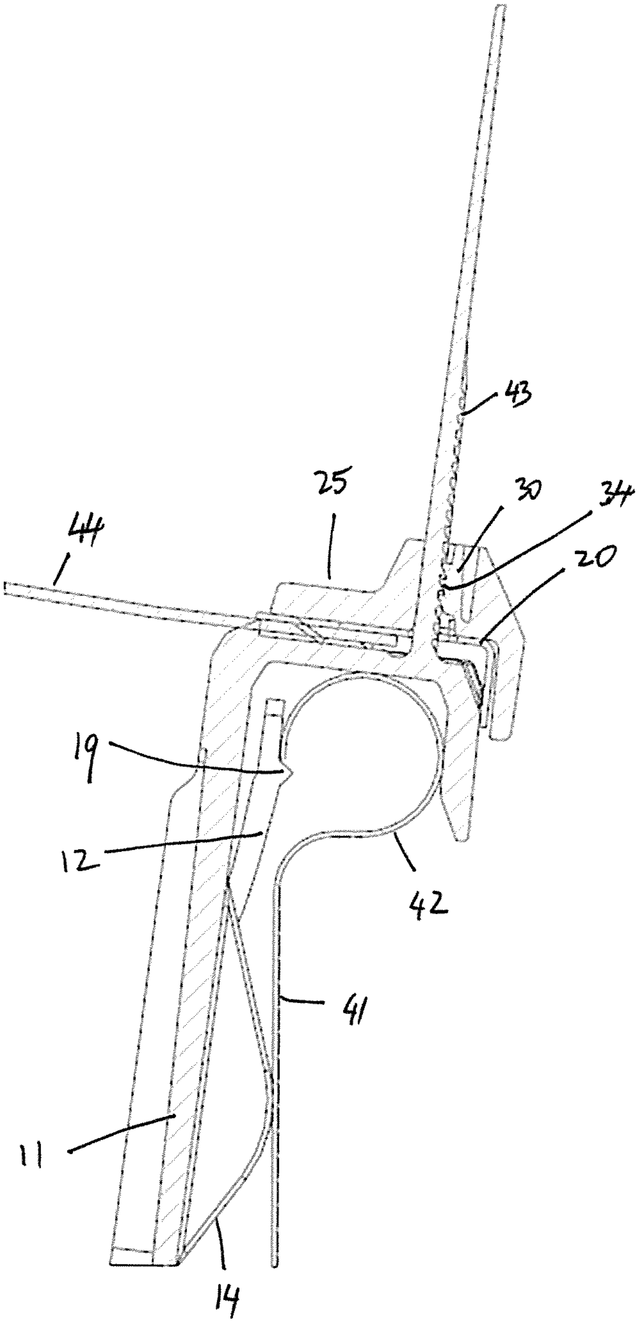
FIG. 21 is a cross sectional view showing the retainer being mounted to the clip and retaining the strip and mesh in position.

As best shown in FIG. 9, the retainer also has an upwardly extending leg 30 that is connected to the retainer at its lower end 31. The upper end 32 of the leg 30 is a free end and it is spaced from the rear wall of the boss by a gap 33. The leg 30 has a number of teeth 34 that face the opening 27. Each tooth 34 has a generally flat upper surface 35 and a sloping side surface 36. These teeth can interact with a series of teeth or separations formed on the upwardly extending projection 17 of the clip 10 in order to lock the retainer 25 to the clip 10. This is best shown in FIGS. 20 and 21 and will be further described hereunder.

Figure 10:
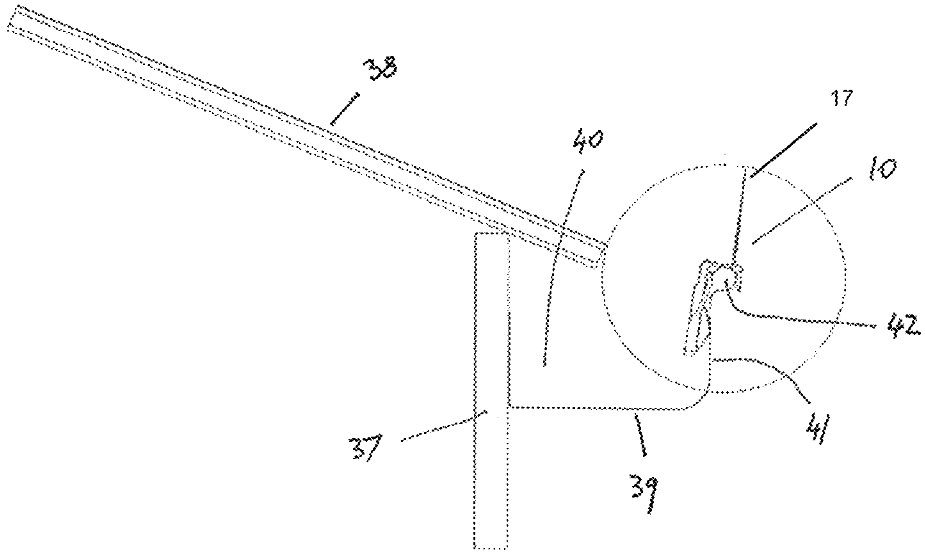
FIG. 10 shows a side view of a clip as shown in FIG. 1 being mounted to a gutter.
Figure 11:
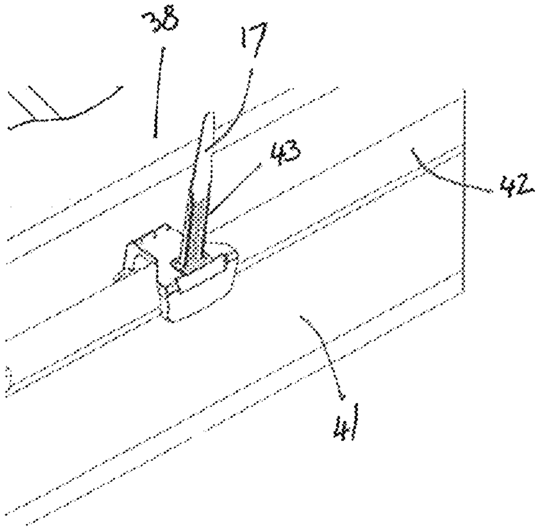
FIG. 11 shows a perspective view of the clip being mounted to the gutter.
Figure 12:
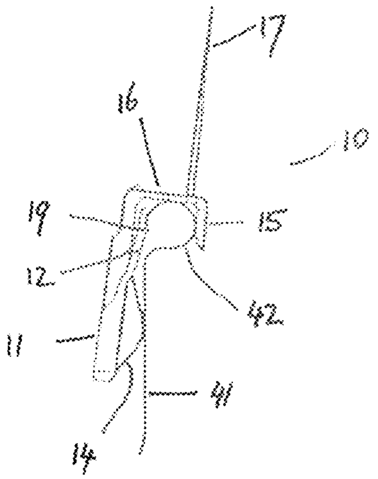
FIG. 12 is an enlarged view of the clip being mounted to the gutter.
Figure 13:
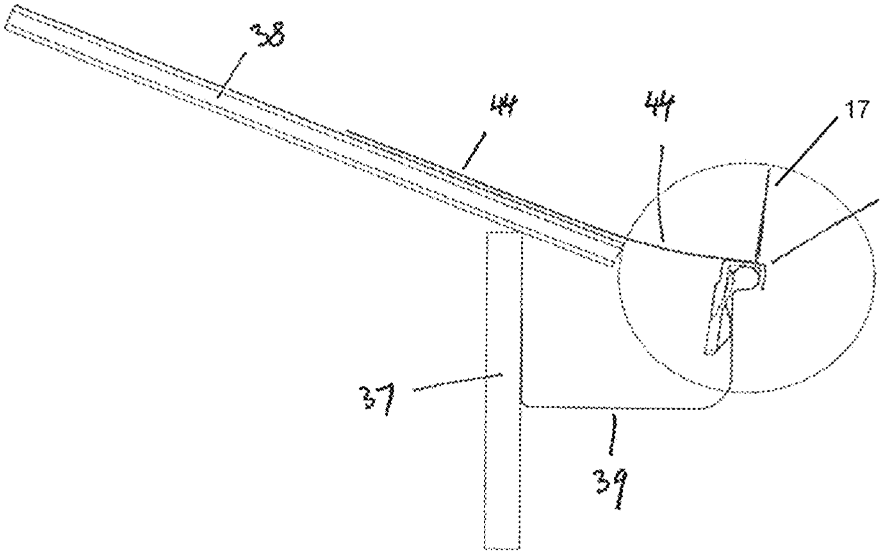
FIG. 13 is a side view of the clip mounted to the gutter and the gutter mesh positioned on the clip.

FIGS. 10 to 12 show various views of the clip 10 being mounted to a gutter. FIG. 10 shows a cross-sectional view of a building that has a side wall 37, a roof 38 and a gutter 39. As can be seen from FIG. 10, the gutter 39 is mounted below the roof 38 such that any water flowing off the roof 38 fall into the valley 40 of the gutter. The gutter also includes a sidewall 41 and a rounded lip 42.

In order to fit the clip 10 to the gutter, the leg 11 is positioned to the inside of the sidewall 41 of the gutter and the rear wall 15 of the clip 10 is positioned to the outside of the rounded lip 42. The clip 10 is then pushed downwardly until the underneath part of the landing area 16 comes into contact with the rounded lip 42. The abutment region 19 of arm 12 (and also of arm 13) will extend under the edge of rounded lip 42 and, due to the resilience of arm 12, it will be retained in that position. The biasing means 14 will also bias the leg 11 away from the sidewall 41 of the gutter and this will also assist in retaining the abutment region 19 in position under the edge of the rounded lip 42 of the gutter. As can best be seen from FIG. 12, the rear wall 15 of the clip 10 is it abutment with the rounded lip 42 of the gutter.

When the clip 10 is in the position as shown in FIGS. 10 to 12, the clip 10 resists removal in the upwards direction due to the abutment region 19 of the arms 12 and 13 being in contact with the edge of the rounded lip 42 of the gutter, thereby assisting in retaining the clip 10 on the gutter. The clip 10 also resists removal from the gutter by moving it inwardly towards the roof due to the rear wall 15 of the clip being in contact with the lip of the gutter. However, it will be appreciated that the clip 10 could still be slid along the length of the rounded lip 42 in order to allow for adjustment of the position of the clip 10 on the gutter. If it is desired to remove the clip 10 from the gutter, both legs 12 and 13 need to be depressed towards the roof in order to disengage the abutment region 19 from the edge of the rounded lip 42.

Figure 18:
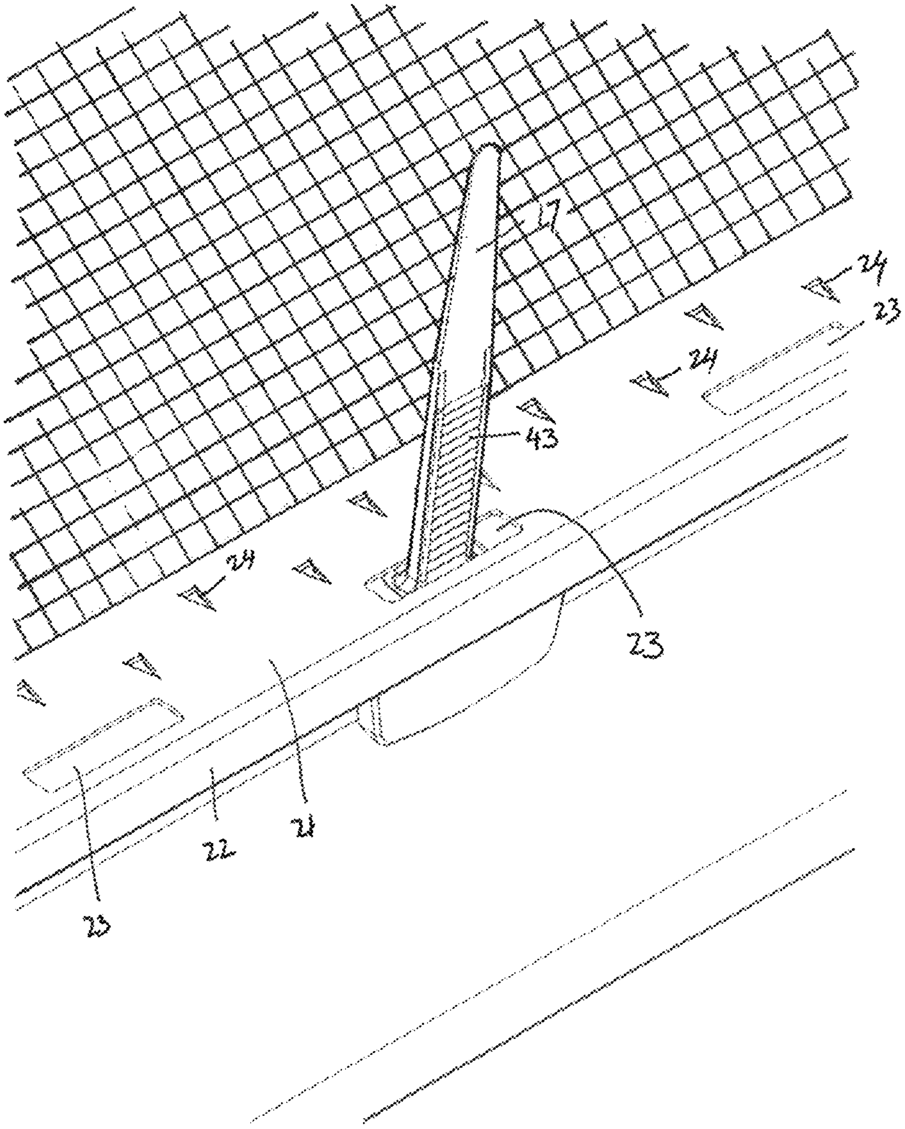
FIG. 18 is a perspective view of the clip, gutter mesh and strip as shown in FIG. 16.
Figure 19:
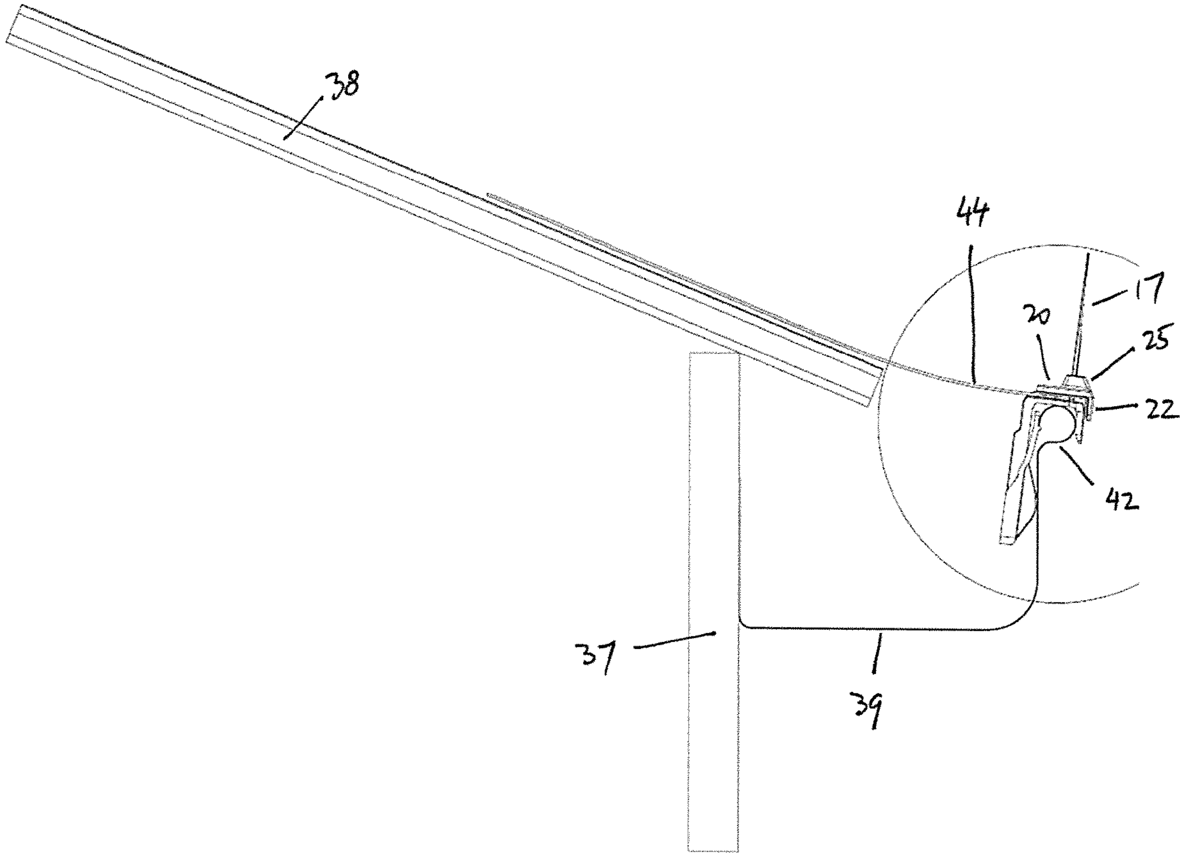
FIG. 19 is a side view showing the arrangement of FIG. 16 having a retainer being mounted to the clip.

As shown in FIG. 11, the upwardly extending projection 17 also includes a plurality of teeth or serrations 43. The teeth 17 include generally horizontal lower surfaces and sloping upper surfaces, can be best seen in FIGS. 18 and 21.

During installation of the gutter mesh, a plurality of clips 10 are positioned on the gutter of the building. Each clip 10 is spaced from another clip by a desired amount, for example, from 15 cm to 60 cm, or about 30 cm. Other spacings may also be used.

Figure 14:
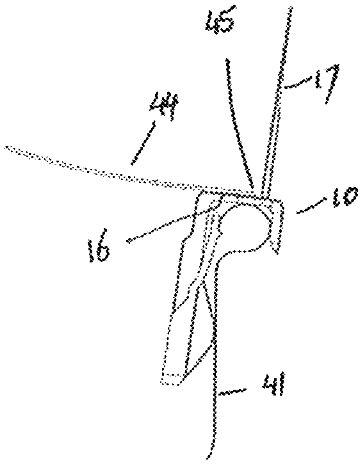
FIG. 14 is a close-up view of the mesh resting on the landing area of the clip.
Figure 15:
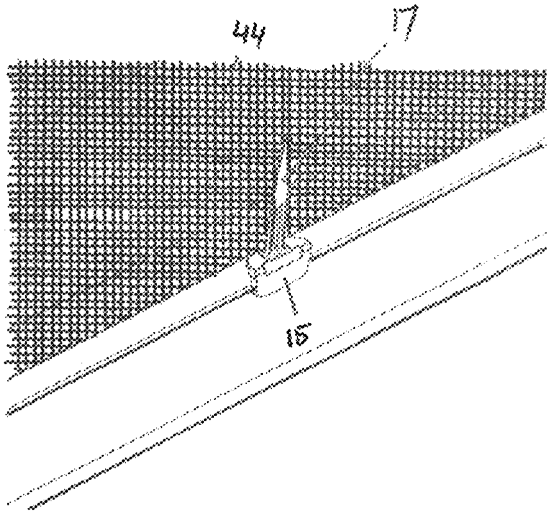
FIG. 15 is a perspective view of the clip attached to the gutter and the mesh resting on the landing area of the clip.
Figure 16:
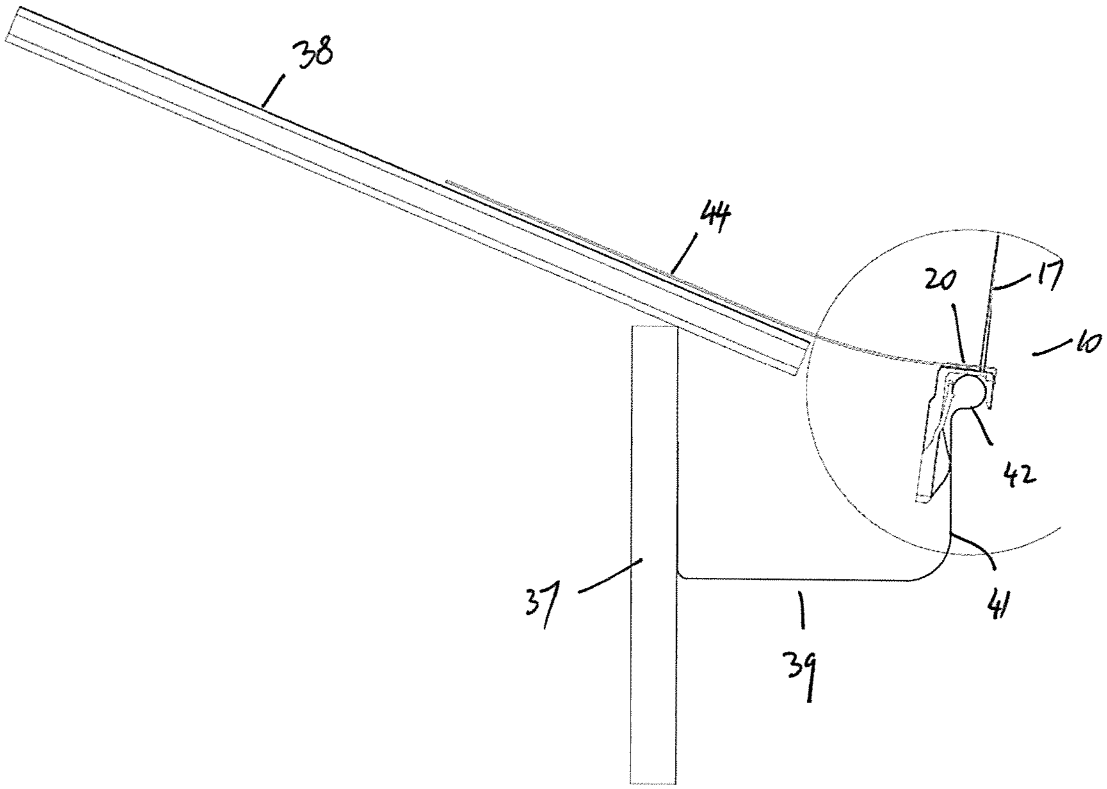
FIG. 16 is a side view of the clip and the mesh shown in FIG. 13 with a strip being positioned thereon.

Once the clips 10 have been positioned on the gutter, the gutter mesh 44 is placed so that portions of the gutter mesh 44 overlying the landing areas 16 of the clips 10. Advantageously, the upwardly extending projection 17 forms a stop member to assist in locating the outer edge of the gutter mesh. As can be seen in FIG. 14, the outer edge 45 of the gutter mesh 44 is positioned adjacent to or in contact with the lower end of the upwardly extending projection 17 of the clip 10. The barbs 18 of the clip 10 extend through openings in the mesh and engage with the material defining those openings to thereby minimise or eliminate inward lateral movement of the gutter mesh 44 relative to the clip 10.

In order to more securely hold the gutter mesh 44 in position, strips 20 are subsequently positioned over the clips and the gutter mesh 44. In particular, an aperture 23 of the strips 20 is brought into alignment with each upwardly extending projection 17 of each clip that lies below the strip 20. In some instances, the upwardly extending projections of two or more clips may extend through respective apertures of each strip 20 although it is also possible that each strip will only be associated with a single clip. It is envisaged that a plurality of strips will be placed end to end of along the extent of the gutter in order to install the gutter mesh on the gutter.

Figure 17:
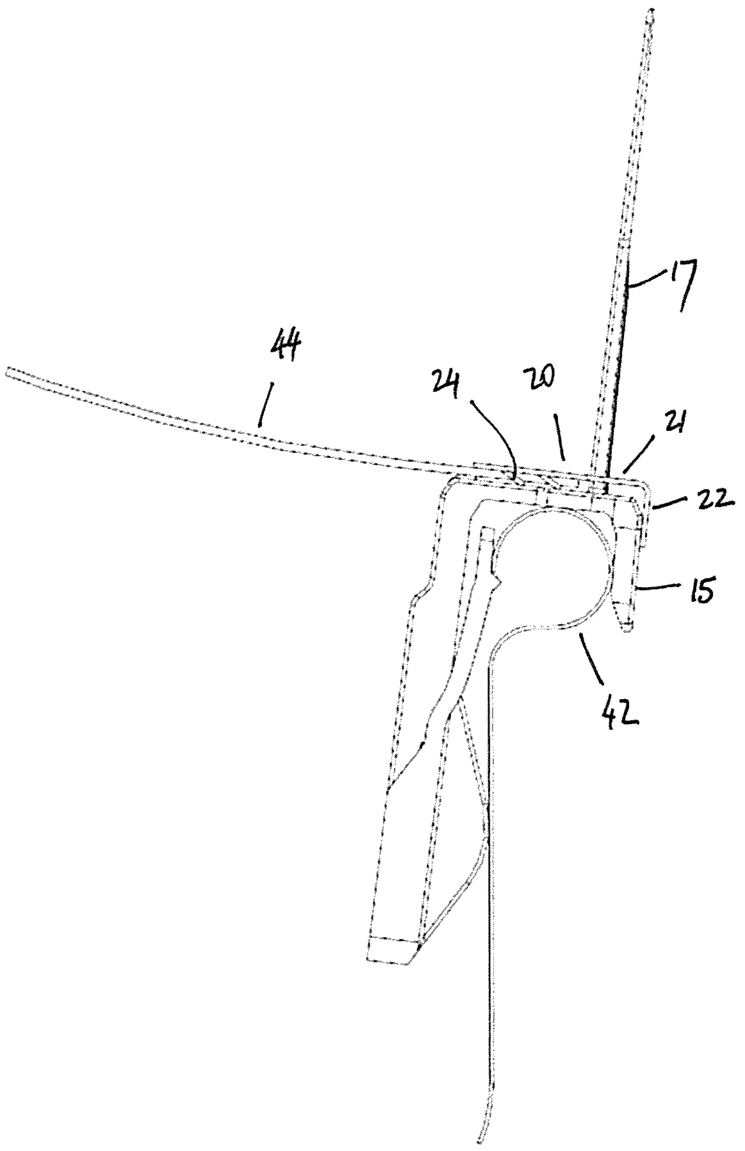
FIG. 17 is a close up view of the clip, mesh and strip as shown in FIG. 16.

As best shown in FIG. 17, the sidewall 22 of the strip 20 overlies at least part of the rear wall 15 of the clip 10. The barbs 24 of the strip 20 extend into openings in the gutter mesh 44 and the barbs 24 interact with the material defining those openings to thereby minimise or prevent relative lateral movement between the strip 20 and the gutter mesh 44. Similarly, as the apertures 23 in the strip 20 closely fit over the base of the upwardly extending projection 17 of the clip 10 (see FIG. 18), lateral movement of the strip 20 relative to the clip 10 is also constrained. As a result, lateral movement between the gutter mesh 44 and in the rounded lip 42 of the gutter is also constrained or prevented.

In order to hold the strip 20 in position relative to the clip 10, a retainer 25 is positioned over the upstanding projection 17 of the clip 10. Each clip that has been fitted to the gutter is suitably provided with its own retainer. In order to fit the retainer 25 to the clip 10, the opening 27 of the retainer 25 is positioned so that it can pass over the upwardly extending projection 17. The retainer 25 is then moved downwardly. The teeth 34 in the retainer 25 engage with the teeth 43 on the upper extending projection 17 of the clip 10. In particular, the arrangement of the teeth 34 and the teeth 43 form a ratchet arrangement where the retainer 25 can move downwards relative to the upwardly extending projection 17 relatively easily until the retainer 25 seats on the strip 20. At this stage, the opposed horizontal surfaces of the teeth 34 and 43 engage with each other to prevent the retainer 25 from being lifted up off the upwardly extending projection 17. In this manner, the retainer 25 locks the strip 20 and the gutter mesh 44 into position relative to the clip 10, and hence, they are locked in place relative to the rounded lip 42 of the gutter. The retainer 25 acts as a locking mechanism in this regard.

Figure 22:
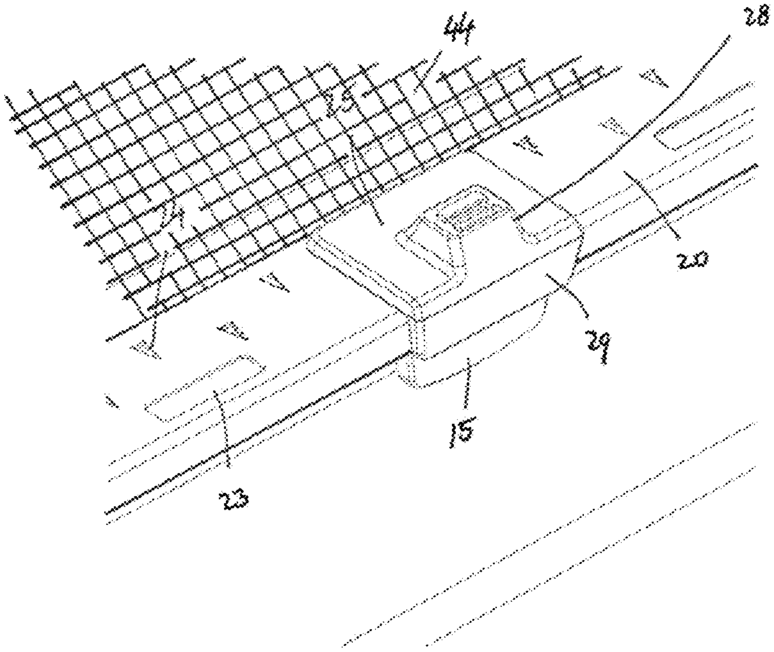
FIG. 22 is a perspective view showing the outer portion of the installed gutter mesh, with the projection of the clip having been cut off.

As shown in FIG. 22, once the retainer 25 has been properly positioned, the part of the upwardly extending projection 17 that extends above the boss 28 of the retainer 25 can be cut off to improve aesthetics. This does not affect functioning in anyway. This step is optional.

Figure 23:
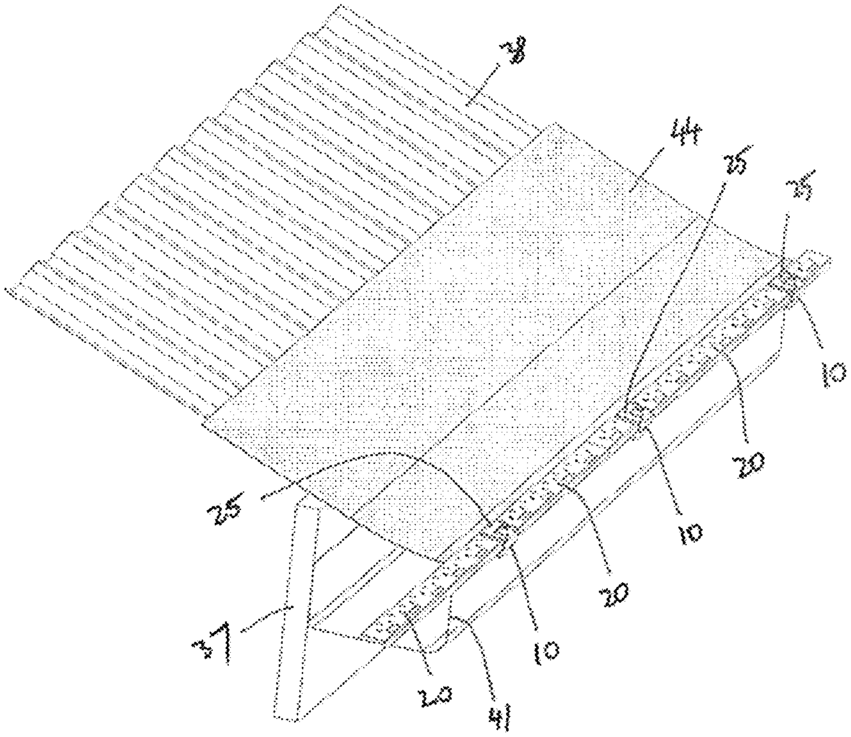
FIG. 23 is a perspective view showing the outer portion of the installed gutter mesh in the installed condition and the gutter mesh extending inwardly over the gutter and over the roof.
Figure 24:
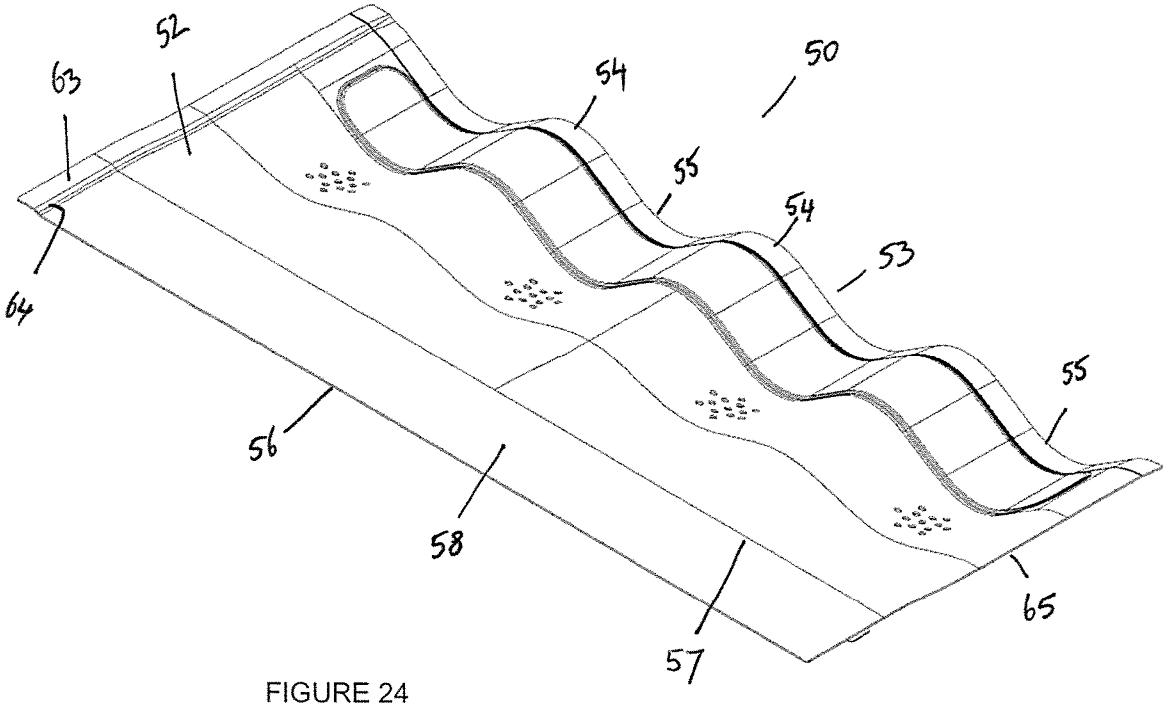
FIG. 24 is a perspective top view of an inner retainer in accordance with one embodiment of the present invention. The inner retainer shown in FIG. 24 is suitable for use with corrugated iron roofs and the inner retainer is suitable for use in installing gutter mesh in accordance with an embodiment of the present invention.

FIG. 23 shows a perspective view of the mesh 44 being installed such that the outer edge of the mesh 44 is locked in position relative to the gutter. As can be seen, a plurality of abutting strips 20 are used. Each strip 20 is associated with a clip 10 and retainer 25. It will, of course, be appreciated that each strip 20 may be associated with more than one clip and retainer. Each clip 20 will have a retainer 25 fitted to it.

It will be appreciated that although the outer edge of the gutter mesh is now effectively affixed to the gutter, the inner edge of the gutter mesh, which overlies the roof of the building, is not yet fixed to the roof. In order to fix the inner edge or inner region of the gutter mesh to the roof, one or more inner retainers are used. In desirable embodiments, the inner retainers do not require that any fixing screws be used to connect the mesh to the roof. In preferred embodiments of the present invention, the inner retainers utilise adhesive or adhesive tape. In a simplest embodiment, a bead or strip of adhesive may simply be run along the inner edge and/or inner region of the gutter mesh, with the bead of adhesive or the adhesive tape forming the inner retainer.

The embodiment shown in FIGS. 24 to 34 use an inner retainer that is suitable for use with corrugated roofs, such as roofs made from corrugated iron. The inner retainer 50 is suitably made from a strip of formed metal or bendable metal or formed by moulding or casting of plastic. It is envisaged that the inner retainer 50 shown in FIGS. 24 to 34, in commercial embodiments, is likely to be made from aluminium or other sheet metal.

The inner retainer 50 has a body 52 having an inner edge 53 that is profiled to match the profile of the corrugated roof. In particular, the inner edge 53 has a series of alternating peaks 54 and troughs 55. The outer edge 56 of the inner retainer 50 is generally flat. The outer region 58 of the inner retainer, generally denoted as extending from the outer edge 56 to reference line 57, is a generally flat region and there is a gradual transition from the profiled inner edge 53 to the outer region 57 of the inner retainer 50. In this manner, the inner edge 53 of the inner retainer 50 can sit substantially flush with the corrugated surface of the roof and the essentially flat outer region or edge can sit essentially flush with the substantially flat inner region of the gutter mesh.

Figure 25:
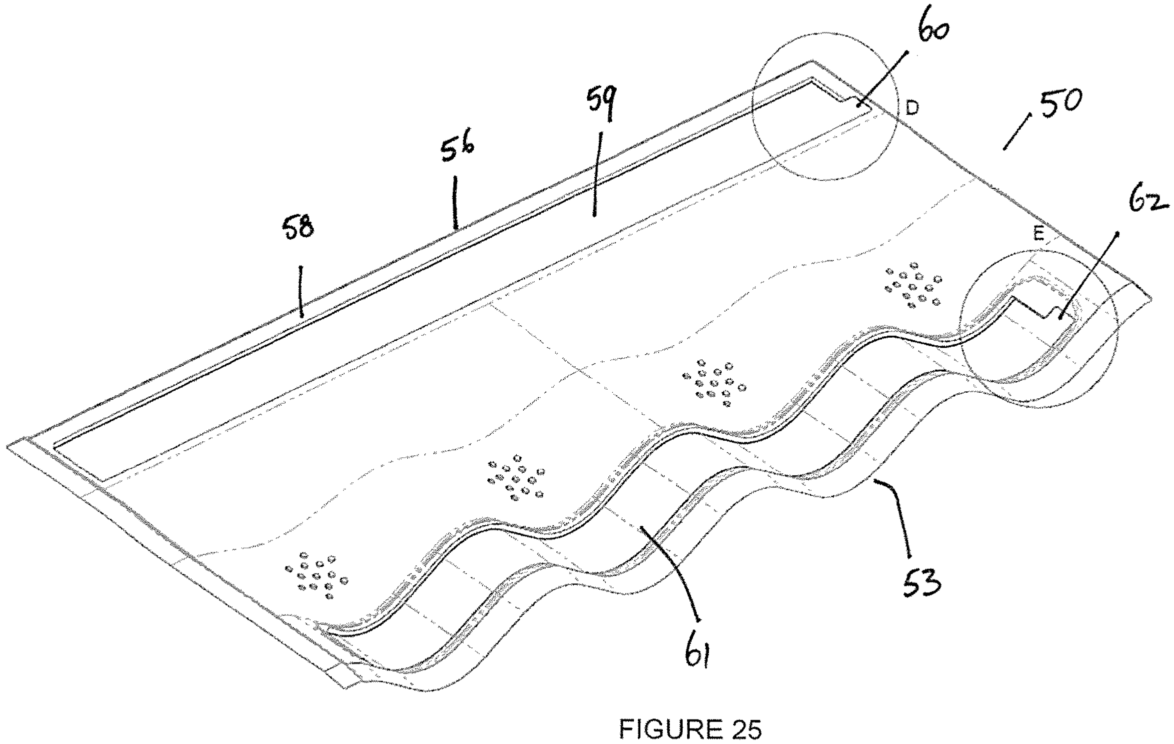
FIG. 25 is an underneath perspective view of the inner retainer shown in FIG. 24.
Figure 26:
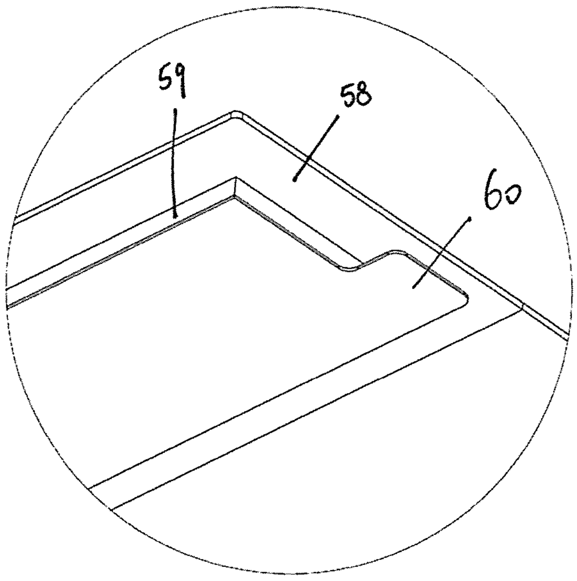
FIG. 26 is a close-up view of the adhesive tape and peel tab on an outer region of the inner retainer shown in FIG. 24.
Figure 27:
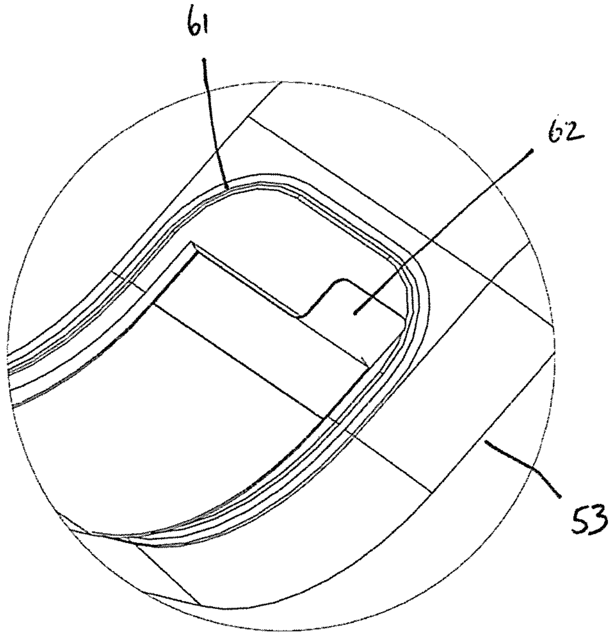
FIG. 27 is a close-up view of the adhesive tape and peel tab on an inner region of the inner retainer shown in FIG. 24.

FIG. 25 shows an underneath view of the inner retainer 50. The outer region 58 has a strip of double-sided adhesive tape 59 applied thereto. A peel layer or release layer having a pull tab 60 covers the lower surface of the double-sided adhesive tape 59. Similarly, another strip of double sided adhesive tape 61 is adhered to the underneath surface of the inner retainer 50 near the inner edge 53 thereof. Again, a peel layer or release layer having a pull tab 62 covers the lower surface of the double sided adhesive tape 61. Details of the pull tab and double-sided adhesive tape are shown in more detail in FIGS. 26 and 27. The pull tabs 60 and 62 facilitate easy removal of the peel layer or release layer from the adhesive.

Figure 28:
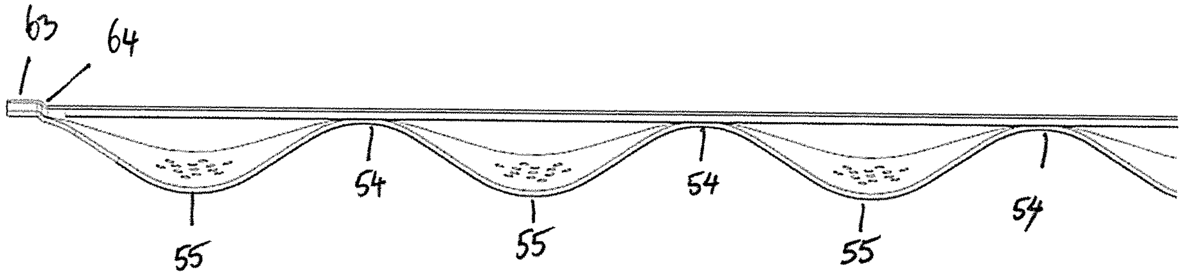
FIG. 28 is a side view of the inner retainer shown in FIG. 24.
Figure 29:
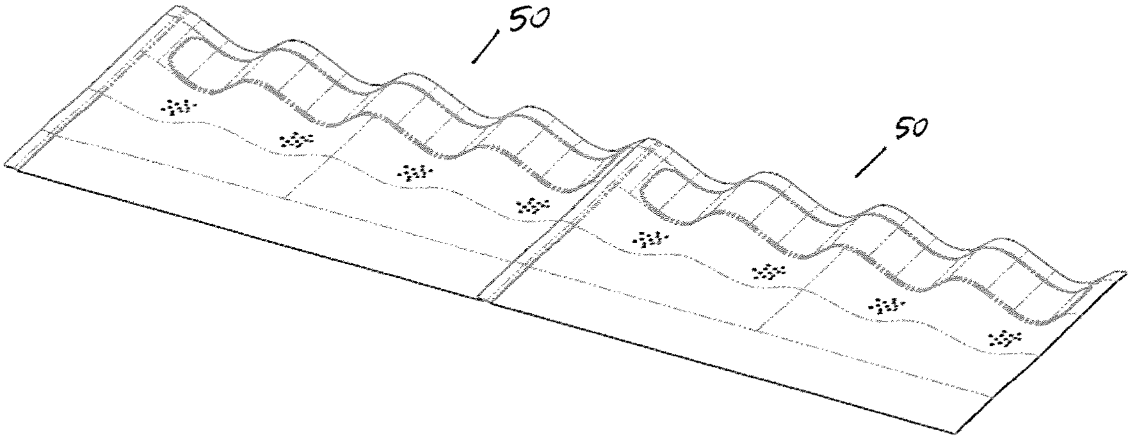
FIG. 29 is a view of two adjacent inner retainers shown in FIG. 24, with the two adjacent inner retainers overlapping each other.
Figure 30:
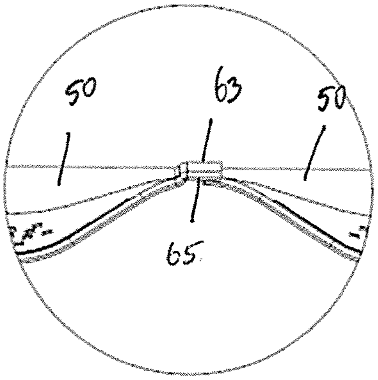
FIG. 30 is a close-up view of the overlapping region of the inner retainers shown in FIG. 29.

The inner retainer 50 also includes a raised region 63 that is formed along one side edge of the inner retainer 50. As shown in FIG. 28 the raised region 63 forms an upwardly extending shoulder 64 near or parallel to the side edge of the inner retainer 50. The raised region 63 is raised to a height that is just sufficient to allow an adjacent side edge of an adjacent inner retainer to sit under the raised region 63. In this manner, adjacent inner retainers 50 can overlap each other whilst still sitting flush with the roof and gutter mesh. This is shown in FIGS. 29 and 30. In particular, FIG. 30 shows the raised edge 63 overlapping and overlying the edge 65 of an adjacent inner retainer 50.

Figure 31:
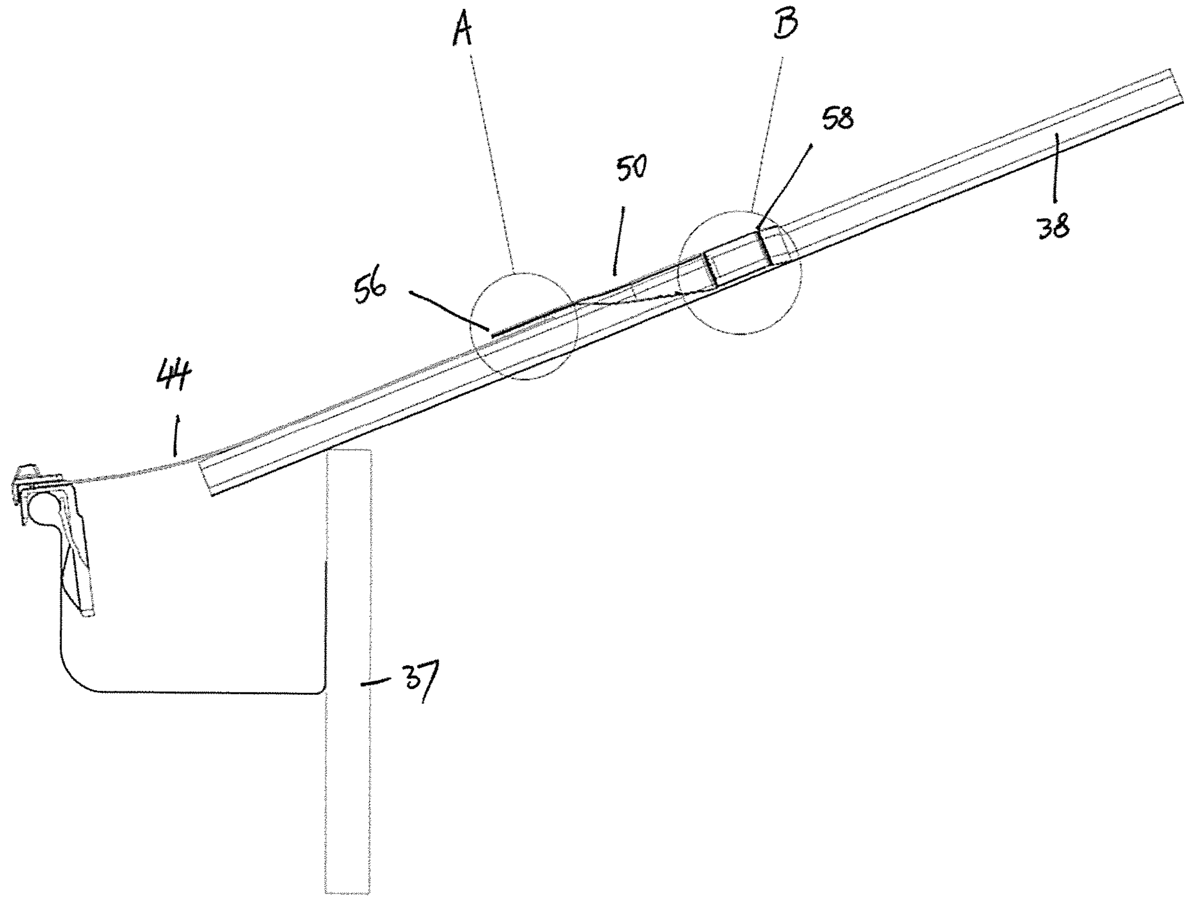
FIG. 31 is a side view showing the inner retainer of FIG. 24 being affixed to the roof and to the gutter mesh.
Figure 32:
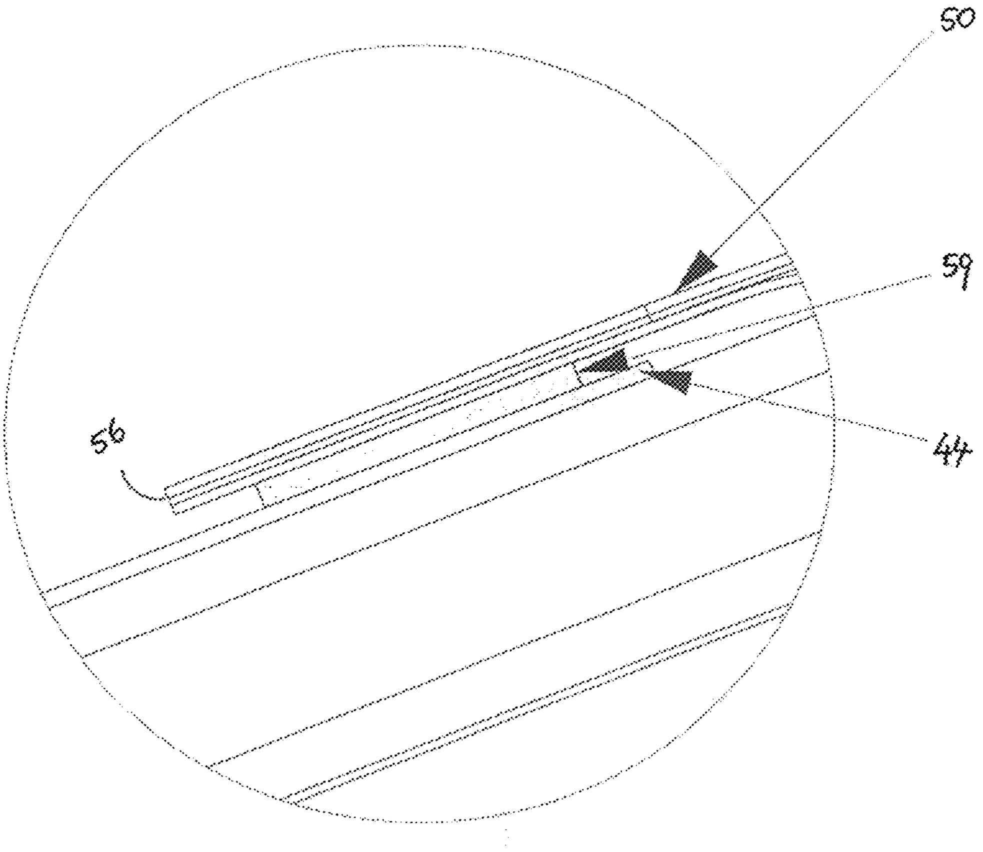
FIG. 32 shows a close-up side view of the outer region of the inner retainer as mounted in FIG. 31.

FIG. 31 shows a side cross-sectional view of the inner retainer 50 being affixed to the roof 38. FIG. 32 shows an enlarged view of region A in FIG. 31 and FIG. 33 so is an enlarged view of region B in FIG. 31. As shown in FIG. 32, the inner retainer 50 is positioned such that the strip of double sided adhesive tape 59 extends over an inner region of the gutter mesh 44. Similarly, the outer edge 56 of the inner retainer 50 also extends over the inner region of the gutter mesh 44. In order to fix the outer region of the inner retainer 50 to the gutter mesh and the roof, the pull tab 60 is used to remove the peel layer or release layer from the strip of double sided adhesive tape 59. The strip of double sided adhesive tape is then pushed firmly onto the gutter mesh, which adheres the gutter mesh to the strip. Some of the adhesive tape may also poke through the openings in the mesh and thereby and here the mesh to the roof that underlies the gutter mesh.

Figure 33:
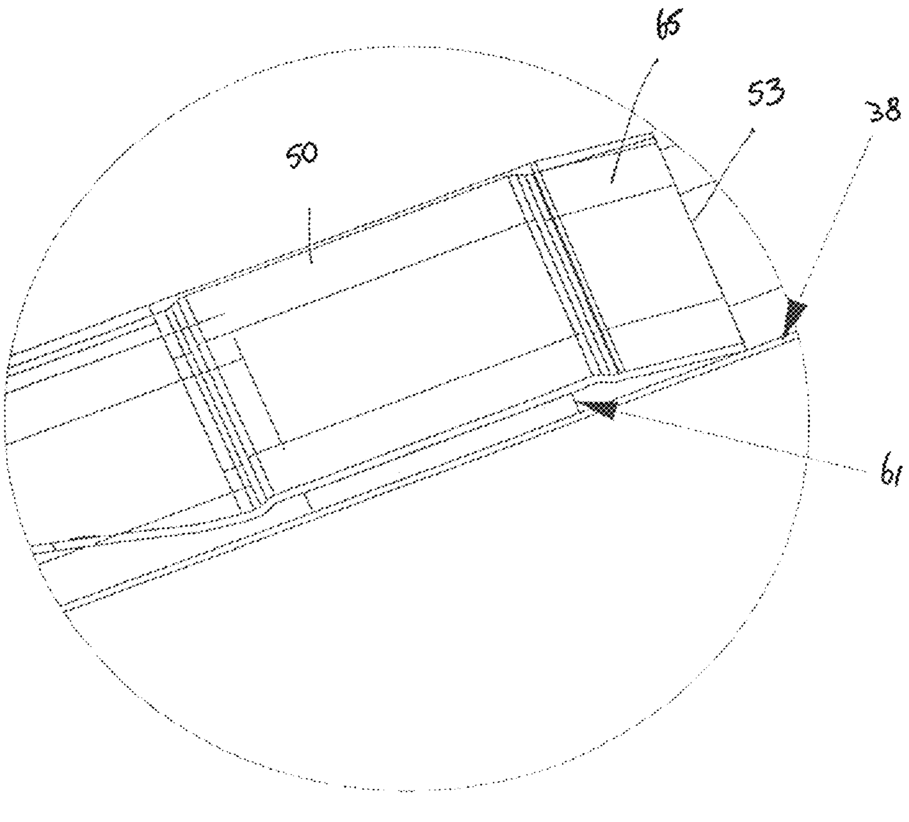
FIG. 33 shows a close-up side view of the inner region of the inner retainer as mounted in FIG. 31.

FIG. 33 shows a similar view demonstrating how the inner edge of the inner retainer 50 is fixed to the roof. In this case, the pull tabs 62 is used to remove the peel layer/release layer from the strip of double sided adhesive tape 61. The inner edge 53 of the inner retainer 50 closely follows the contour of the corrugated roof. The inner edge 53 is positioned such that the profile of the inner edge conforms to the profile of the corrugations and the double sided adhesive tape 61 is pressed into firm contact with the roof to thereby affix the double sided adhesive tape 61 to the roof. As shown in FIG. 33, an inner region 65 of the inner retainer 50 may be folded downwardly or extend in a downwards direction so that the inner edge 53 sits closely flush with the profile of the roof 38. In this regard, the downwardly folded or downwardly extending inner region 65 can account for any gaps between the roof and the inner retainer that would be caused by the strip of double sided adhesive tape 61.

Figure 34:
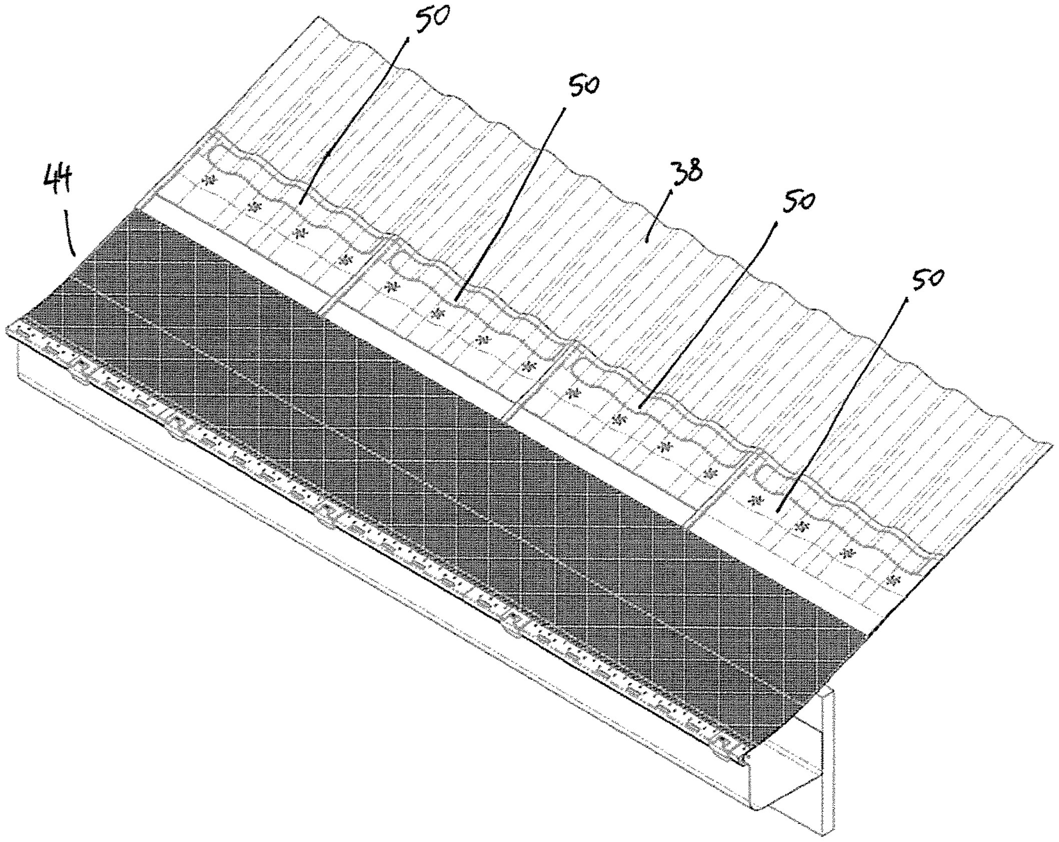
FIG. 34 shows a perspective view of fully installed gutter mesh on a corrugated roof.

FIG. 34 shows the gutter mesh 44 being secured to a corrugated roof 38 using a plurality of inner retainers 50. FIG. 34 shows a fully installed gutter mesh.

Figure 35:
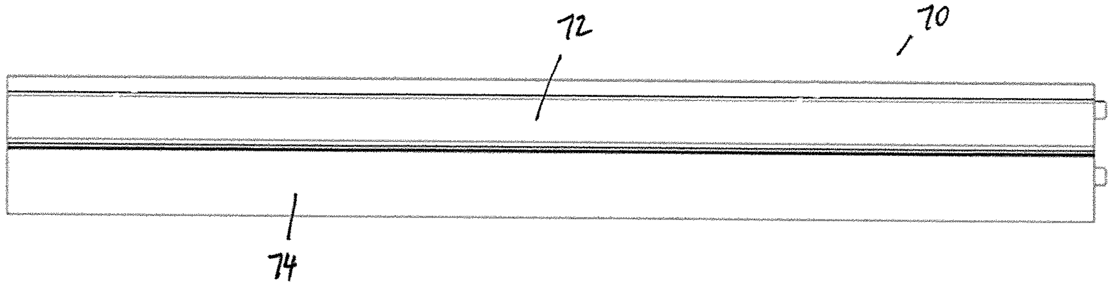
FIG. 35 shows an underneath view of an inner retainer suitable for use with flat roofs. The inner retainer shown in FIG. 35 is suitable for use with flat iron roofs and the inner retainer is suitable for use in installing gutter mesh in accordance with an embodiment of the present invention.

FIG. 35 show an inner retainer 70 that is suitable for use in fixing gutter mesh on flat roofs, such as roofs made from flat tiles or roofs made from slate. The inner retainer 70 comprises an inner region 72 and an outer region 74. The inner retainer 70 is in the form of a generally flat strip. Inner region 72 may comprise a strip of rubber or other flexible plastic material. Outer region 74 may comprise a strip of metal. Of course, it will be appreciated that the inner retainer 72 may comprise a single material, such as a strip of metal, a strip of rubber, or a strip of plastic.

Figure 36:
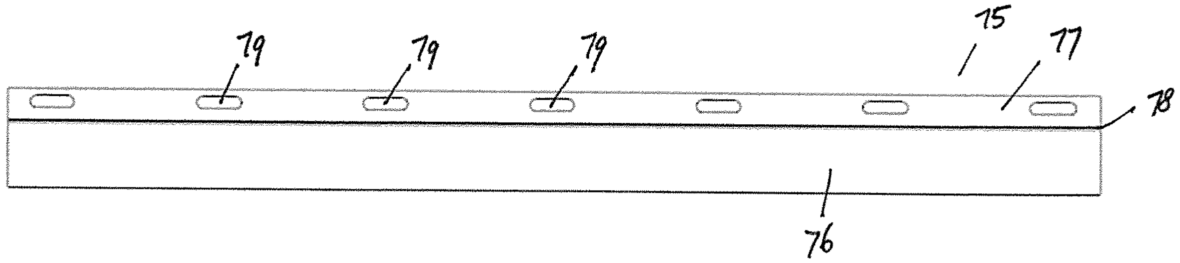
FIG. 36 shows a of a metal strip used to make the inner retainer shown in FIG. 35.
Figure 37:
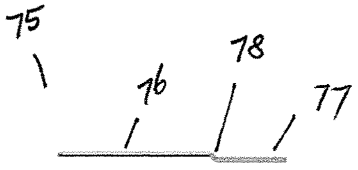
FIG. 37 shows an end view of the metal strip shown in FIG. 36.

FIGS. 36 and 37 show a top view and an end view, respectively, of the strip of material that forms the outer region 74. The strip of material 75 comprises a strip of metal, such as a strip of aluminium. The strip of metal 75 has a generally flat region 76 and a lower region 77 that is interconnected to flat region 76 via step 78. A plurality of openings 79 are formed in the lower region 77

Figure 38:
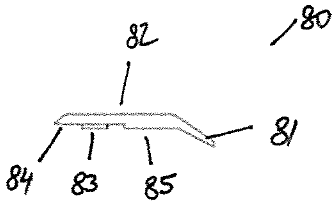
FIG. 38 shows and end view of a rubber strip used to make the inner retainers shown in FIG. 35.
Figure 39:
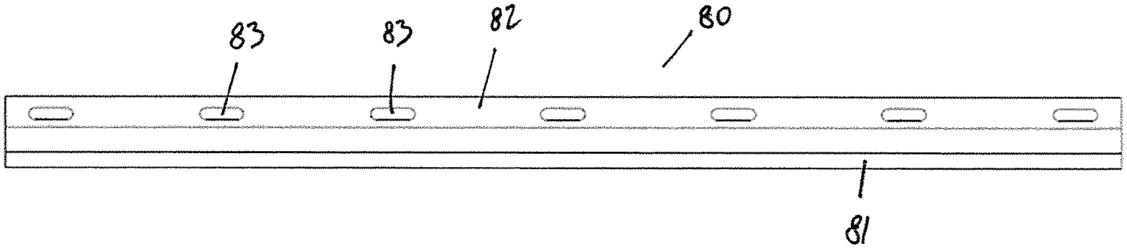
FIG. 39 shows the top view of the rubber strip shown in FIG. 38.

A strip 80 that forms the inner region of inner retainer 70 is shown in FIGS. 38 and 39. Strip 80 is a strip of rubber, such as a natural rubber or a synthetic rubber. The strip comprises a downwardly extending lip 81 that extends along an inner region thereof and an outer region 82 that has a series of projections 83 formed in a recessed region 84 of the lower surface 85 thereof. As can be seen from FIGS. 36 and 39, the projections 83 are of complementary shape to the opening 79 in the metal strip 75.

In order to form the inner retainer 70, the rubber strip 80 is positioned such that the projections 83 project into the opening 79 of the metal strip 75. The rubber strip 80 are then press fitted so that the projections 83 extend through the opening 79 and engage with the edges of the opening 79 to thereby retain the projections 83 in the opening 79. An adhesive may also be used to assist in joining the rubber strip 82 the metal strip 75.

Figure 40:
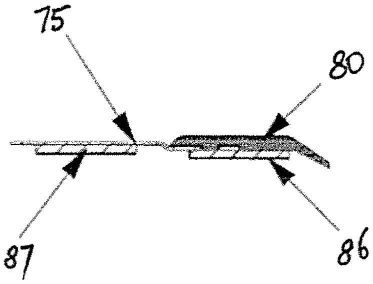
FIG. 40 shows an end view of the inner retainer shown in FIG. 35.

As can be seen from FIG. 40, the rubber strip 80 and the metal strip 75 are each provided with respective strips of double sided adhesive tape 86, 87. Although not shown in FIG. 40, the double sided adhesive tape 86 and 87 will be provided with peel layers/release layers and pull tabs in a manner that is similar to the embodiment shown in FIGS. 24 to 34.

Figure 43:
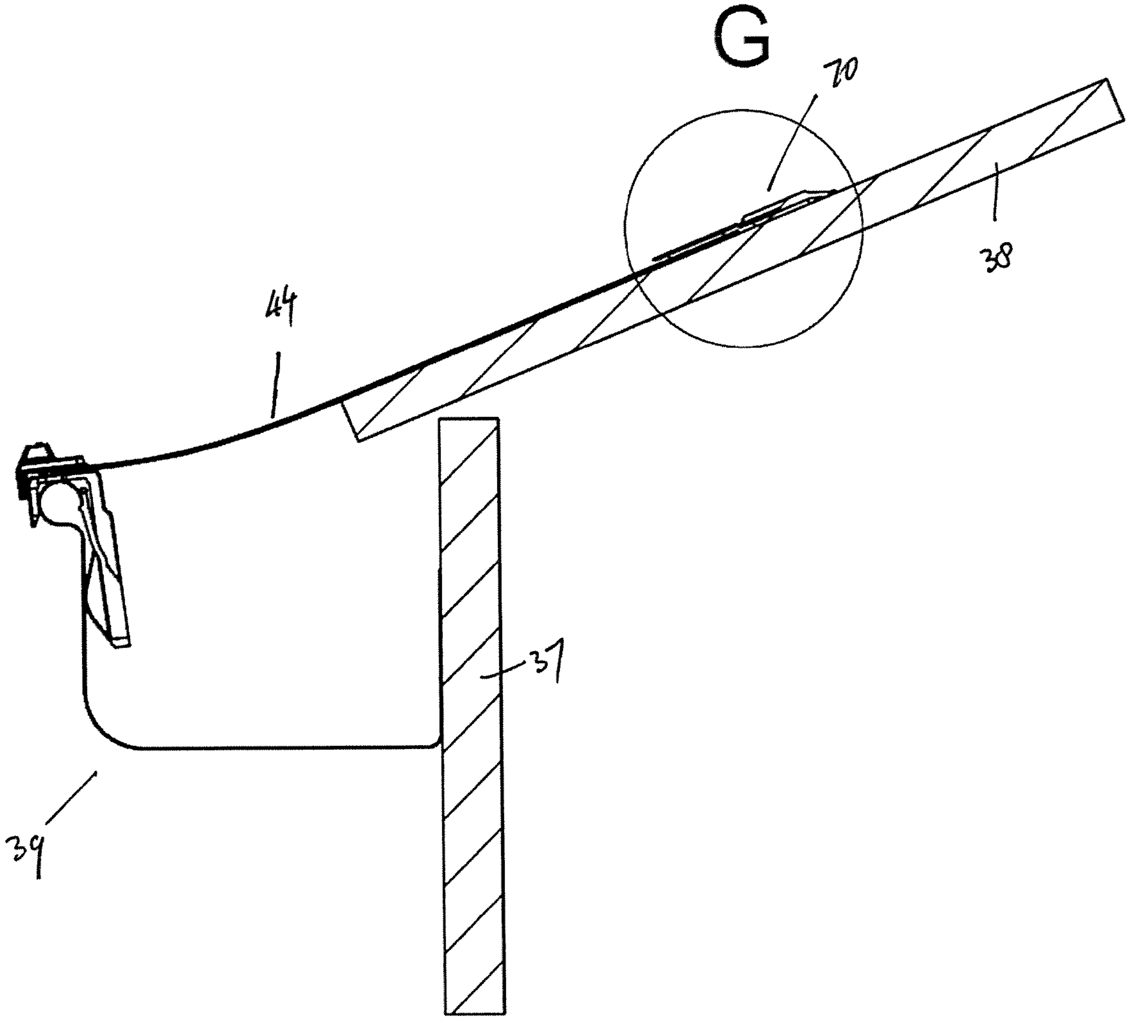
FIG. 43 shows a side view of the installed gutter mesh shown in FIG. 41.
Figure 44:
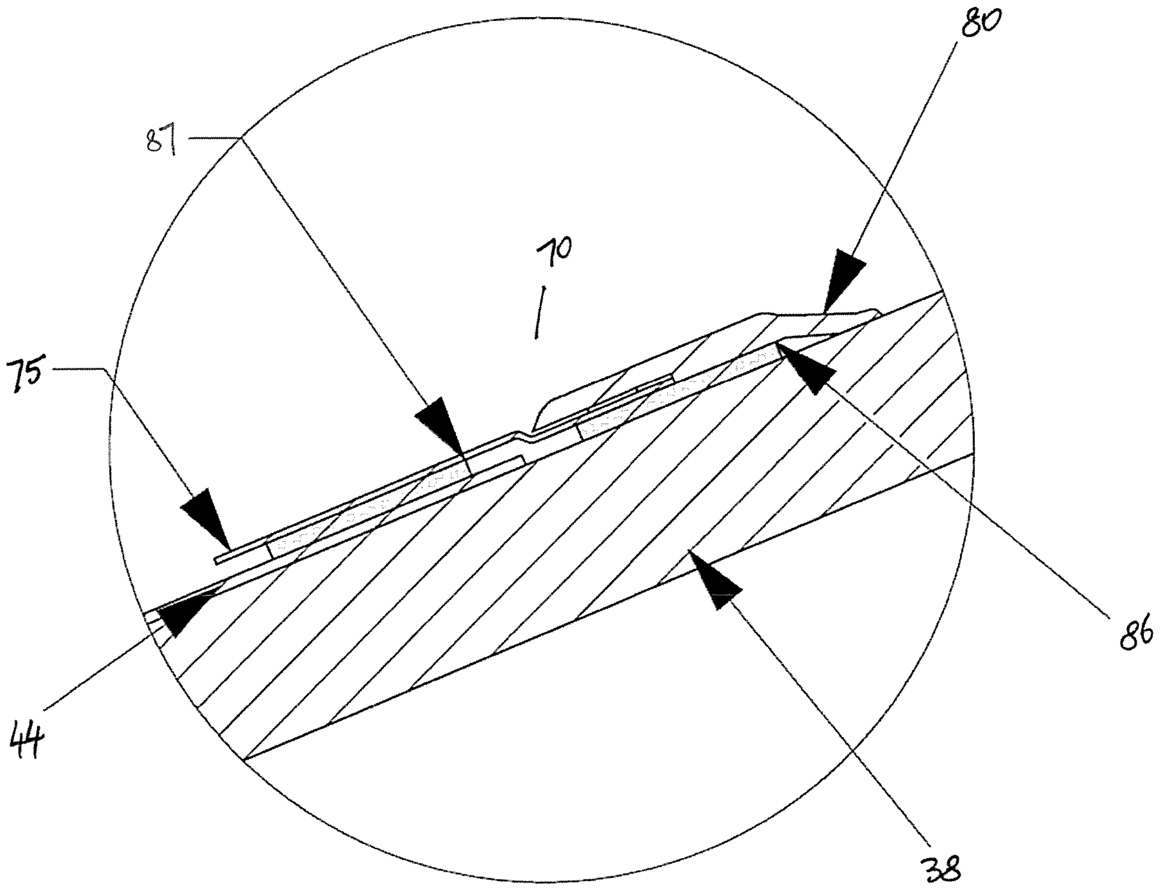
FIG. 44 shows a close-up view of the inner retainer being installed over the gutter mesh.

In order to fit the inner retainers 70 to the roof, the peel layers/release layers of the strips of double sided tape 86, 87 are removed to expose the lower adhesive surfaces. The metal strip 75 is positioned so that extends over the inner region of the gutter mesh 44. The rubber strip 80 is positioned so that it extends over the roof 38 beyond the inner edge of the gutter mesh 44. The retainer is pushed downwardly to activate the double sided adhesive tape strips 86 and 87 and to fix the inner retainer 72 the mesh and to the roof. This is shown in FIGS. 43 and 44.

Figure 41:
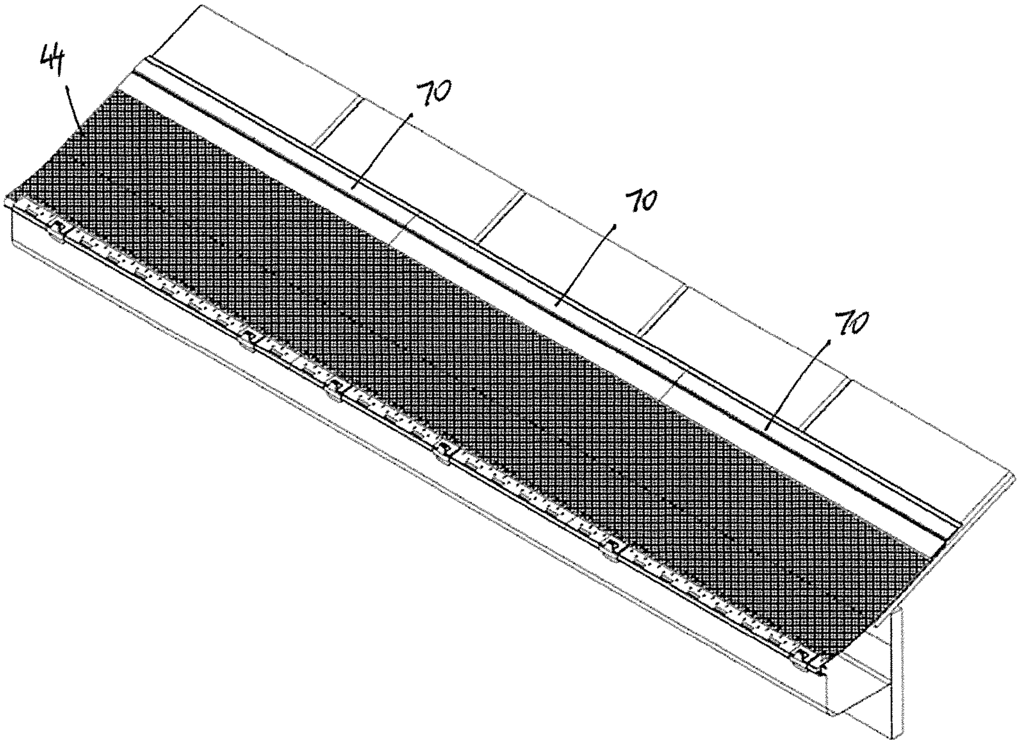
FIG. 41 shows a perspective view of gutter mesh being fully installed on a flat roof.
Figure 42:
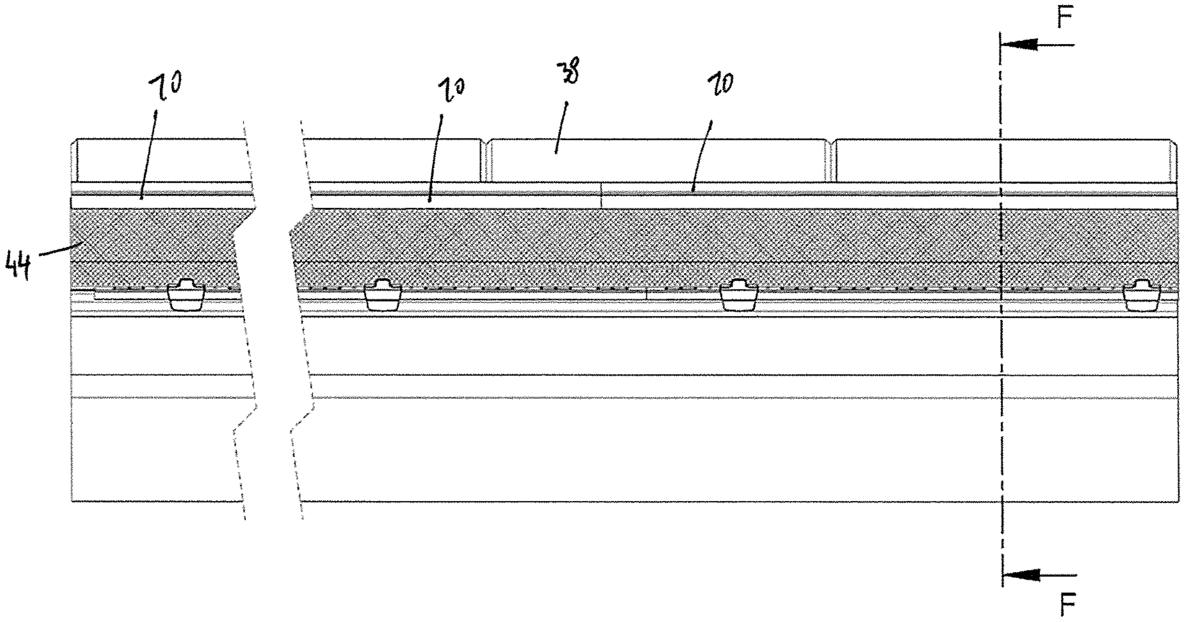
FIG. 42 shows a front view of the gutter and installed gutter mesh shown in FIG. 41.

FIGS. 41 and 42 show a perspective view and a front view of the gutter mesh 44 being fully installed to the gutter and a flat roof. The inner retainer 70 may also be provided with similar side edge details as the inner retainer 50 shown in FIGS. 24 to 34 so that adjacent inner retainers 70 can overlap each other. Alternatively, the edges of the adjacent inner retainers 70 may simply abut onto each other. As can be seen from FIG. 41, the inner retainers 70 are closely positioned next to each other to ensure that a firm fixing of the inner edge of the gutter mesh is obtained.

Figure 45:
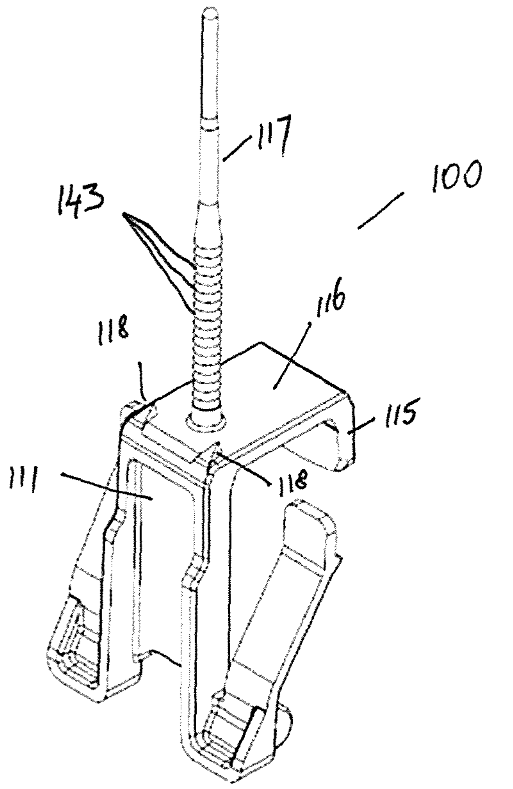
FIG. 45 shows a perspective view of an alternative clip for use in another embodiment of the present invention.
Figure 46:
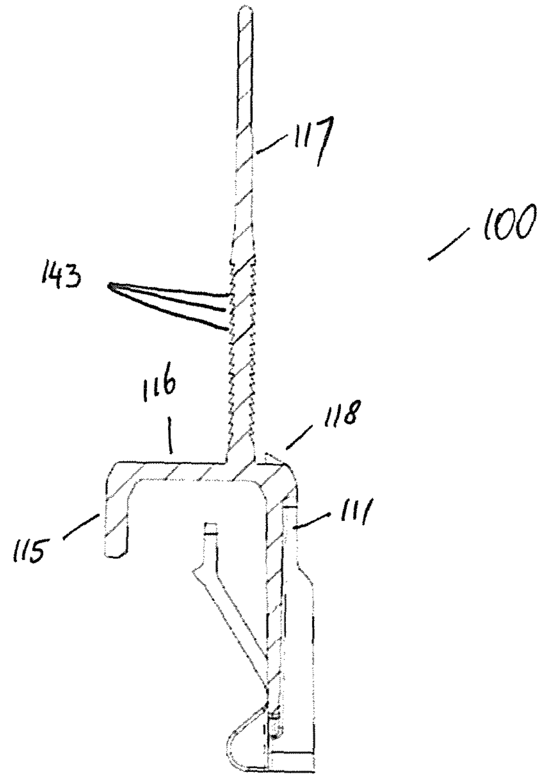
FIG. 46 shows a cross-sectional side view of the clip shown in FIG. 45.

FIGS. 45 to 52 show various components and views of an alternative embodiment of the present invention. FIGS. 45 and 46 show views of an alternative clip 100 suitable for use in an embodiment of the present invention. The clip 100 has a similar arrangement of legs to the clip 10 as shown in FIGS. 1 and 2 and these legs will not be described further. The clip 100 has a rear wall 115 that, in use, overlies the outer edge of the gutter. The rear wall 115 may also be described as the outer wall of the clip 100. A landing area 116 is provided inwardly of the rear wall 115, with the landing area 116 being located between the rear wall 115 and the inner leg 111. An upstanding projection 117 extends upwardly from the landing area 116. As can be seen when compared to the clip shown in FIGS. 1 and 2, the upstanding projection 117 is located further away from the rear/outer wall 115 and closer to the inner leg 111. As a result, the landing area 116 has a significant area located outwardly from the projection 117. The clip 100 is also provided with inwardly extending projections 118 that function similarly to projections 18 that are shown in the clip of FIG. 1.

The projection 117 also includes a plurality of ridges 143 extending along a lower part of its length. As best seen in FIG. 46, the plurality of ridges 143 form downwardly extending teeth when seen in cross-section. The upper part of the projection 117 tapers inwardly and upwardly, as can be seen in FIGS. 45 and 46.

Figure 47:
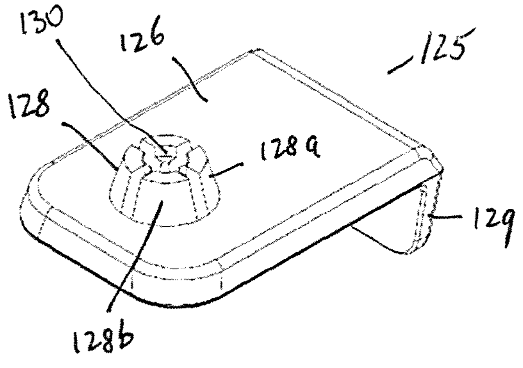
FIG. 47 shows a perspective view of a retainer for use with the clip shown in FIG. 45.
Figure 48:
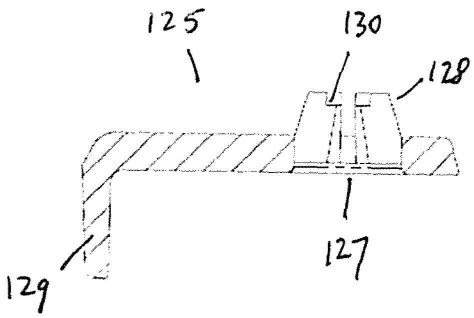
FIG. 48 shows a cross-sectional side view of the retainer shown in FIG. 47.

FIGS. 47 and 48 show a retainer 125 in accordance with one embodiment of the present invention. The retainer 125 has a body 126. An opening 127 is formed in the body. A boss 128 extends upwardly from a top surface of the body 126 and the opening 127 is formed in the boss 128. The retainer 125 also has a downwardly extending side wall 129. The sidewall 129, in use, forms an outer wall of the retainer.

The boss 128 is formed of four spaced segments, two of which are numbered at 128*a* and 128*b*. Each segment of the boss has a shoulder 130 formed therein. Shoulder 130 is located below the top of the boss segments. When the retainer 125 is positioned so that the projection 117 extends through the opening 127 of the retainer, the ridges 143 on the projection spread the boss segments 128*a*, 128*b* apart from each other as they pass through. When the lower most ridge 143 has passed through the opening, the bottom edge of that ridge rests on the shoulders 130, thereby rendering it difficult to remove the retainer 125 from the projection 117. In this manner, the retainer 125 can be firmly retained on the projection 117.

Figure 49:
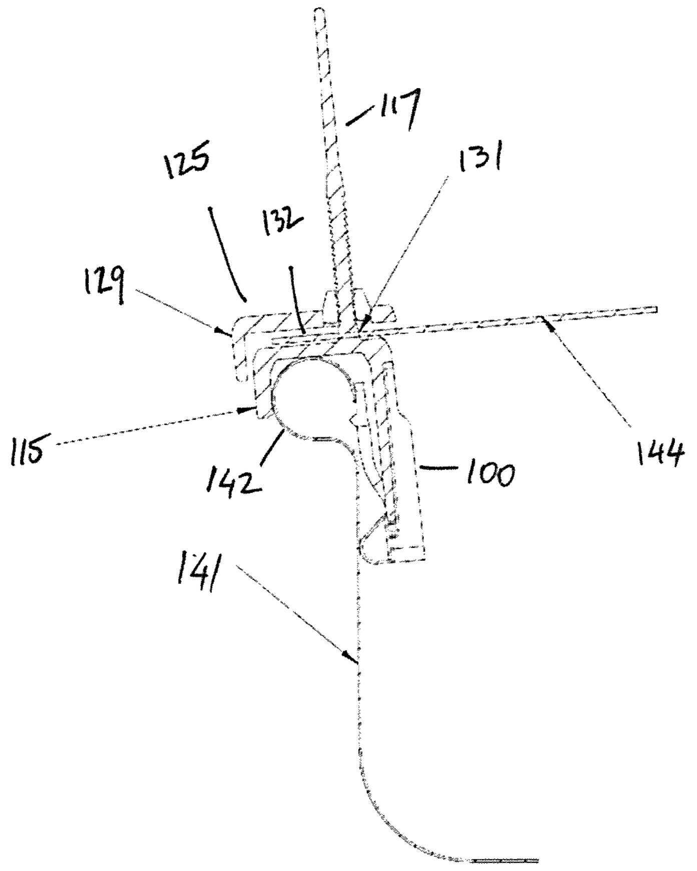
FIG. 49 shows a cross-sectional side view of gutter mesh being installed using the clip shown in FIGS. 45 to 48, with the embodiment shown in FIG. 49 not requiring a trim strip/retaining strip.
Figure 50:
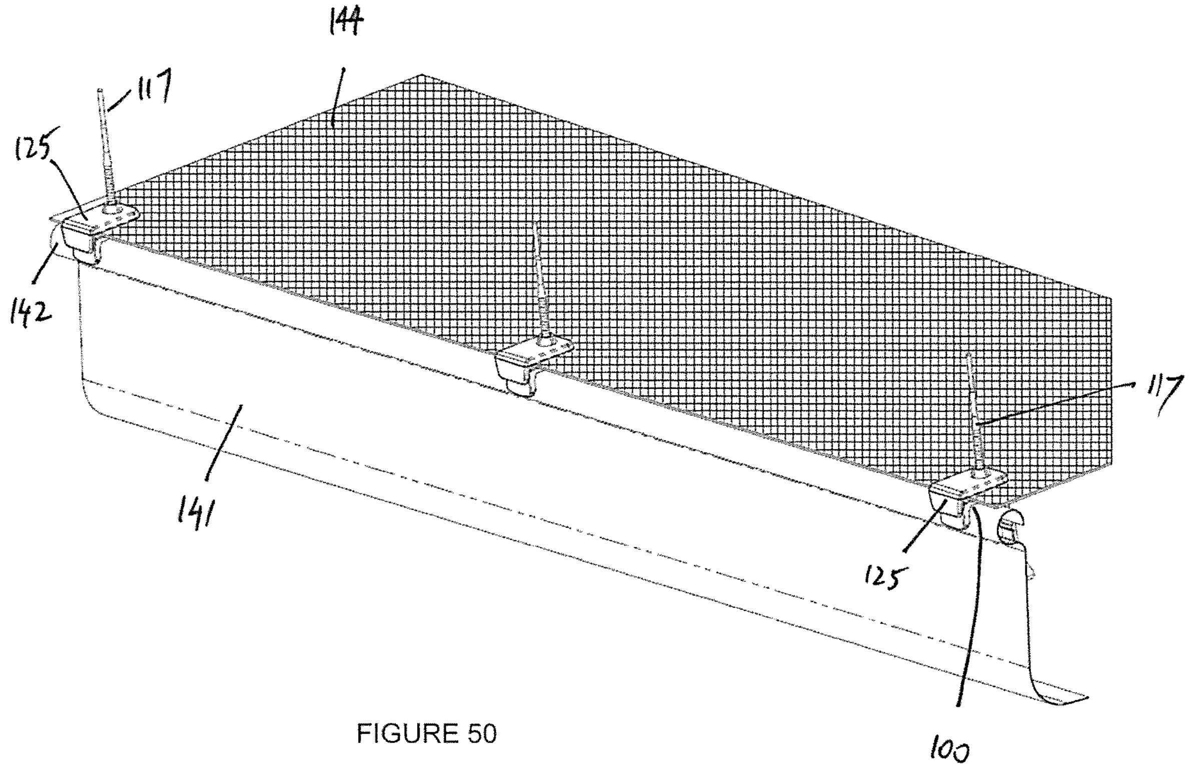
FIG. 50 is a perspective view of the installed gutter mesh as shown in FIG. 49.

FIG. 49 shows gutter mesh being fixed to a gutter using the clip and retainer as shown in FIGS. 45 to 48. In order to fit the gutter mesh in this embodiment of the invention, the clip 100 is fitted to the gutter in the same manner as the clip 10 shown in FIG. 1, with the clip 100 being positioned to clip onto the rounded edge 142 of the sidewall 141 of the gutter. The gutter mesh 144 is then positioned so that the projection 117 of the clip 100 passes through an aperture 131 of the gutter mesh 144. The outer edge of the gutter mesh 144 extends outwardly beyond the projection 117. As can be seen from FIG. 49, a region 132 of the gutter mesh 144 overlies the landing area 116 of the clip 100. The projections 118 on the clip 100 also extend into apertures of the gutter mesh 144 to further hold the gutter mesh in place. The retainer 125 is then pushed down over the projection 117 of the clip 100 to retain the gutter mesh in place.

The embodiment shown in FIG. 49 does not require the use of a strip, such as the trim strip 20 shown in the embodiments of FIGS. 1 to 23. The fitted gutter mesh in accordance with this embodiment is shown in perspective view in FIG. 50.

Figure 51:
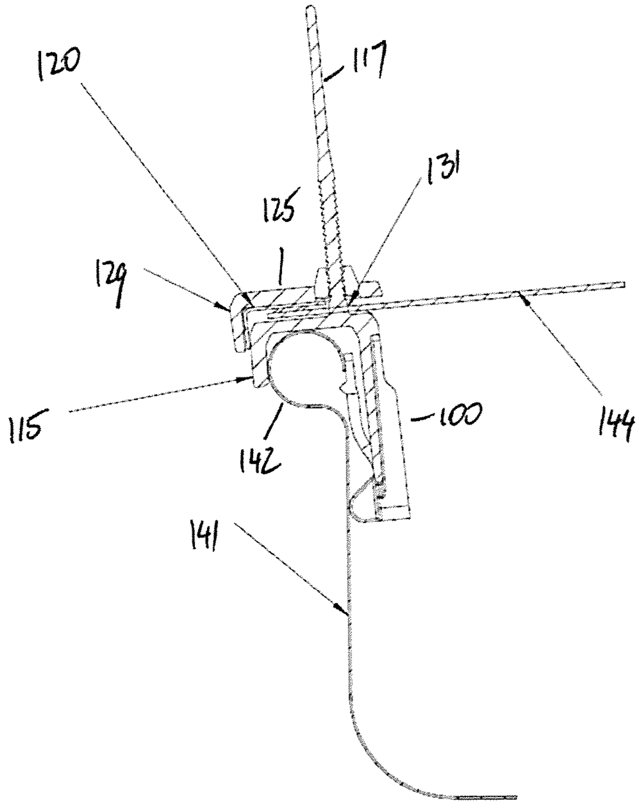
FIG. 51 shows a cross sectional side view of gutter mesh being installed using the clip shown in FIGS. 45 to 48, with the embodiment shown in FIG. 51 using a trim strip/retaining strip to assist in retaining the outer edge of the gutter mesh.
Figure 52:
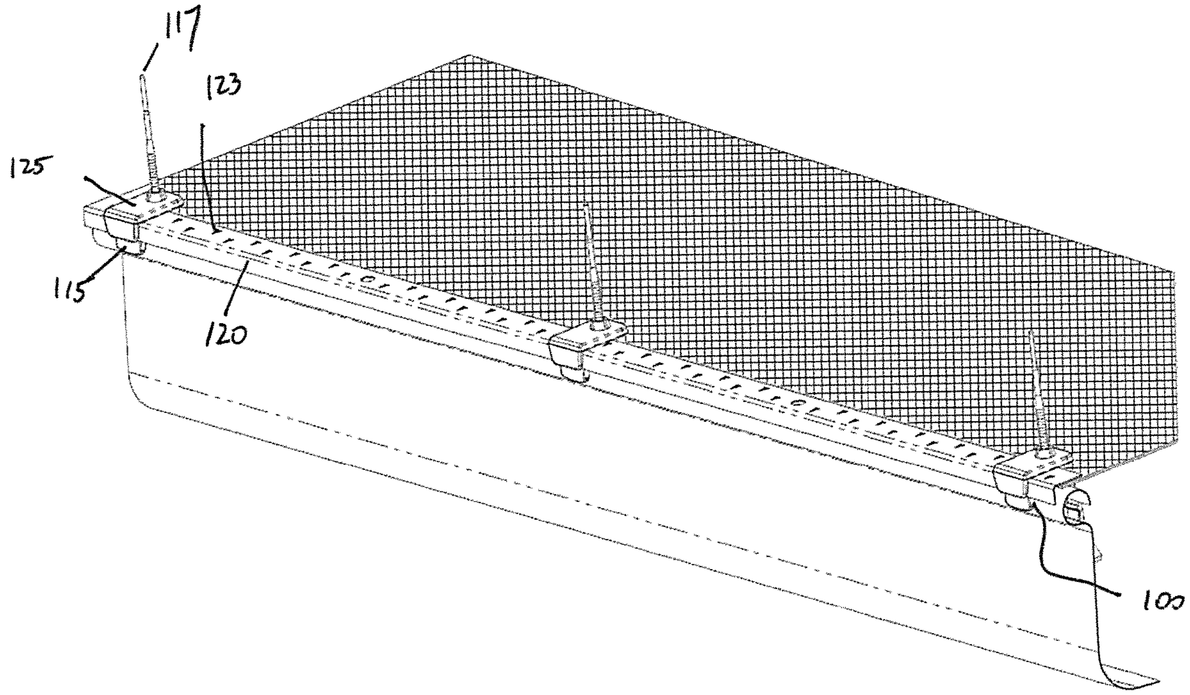
FIG. 52 shows a perspective view of the installed gutter mesh as shown in FIG. 51.

It will also be appreciated that the clip and retainer as shown in FIGS. 45 to 49 can also be used to install gutter mesh using a trim strip similar to the strip 20 as shown in FIGS. 4 to 6. However, the strip used in conjunction with the clip 100 and retainer 125 may not need the apertures 23 to fit over the projection 117 of the clip 100, because the strip may sit outwardly of the projection 117 of the clip 100. This is shown in FIG. 51, where the clip is applied to the gutter, the gutter mesh fitted to the clip so that the projection 117 of the clip 100 extends through an aperture in the gutter mesh. The strip 120 is then fitted so that the teeth 123 of the strip 120 engage with openings in the gutter mesh and the inner edge of the strip 120 abuts the projection 17. The retainer 125 can then be fitted to hold the mesh 144 and strip 120 in position. This is shown in cross-sectional view in FIG. 51 and perspective view in FIG. 52.

Figure 53:
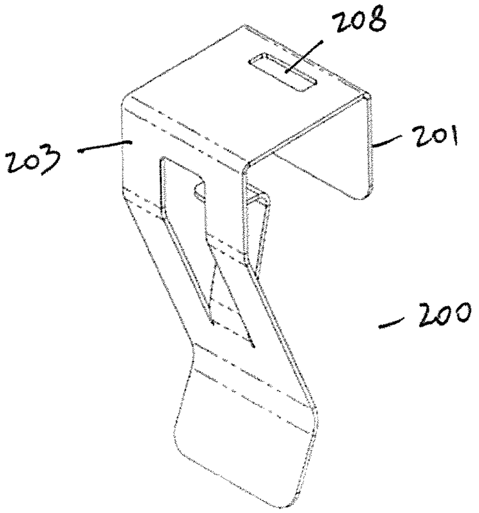
FIG. 53 shows a perspective view of a clip in accordance with another embodiment of the present invention.
Figure 54:
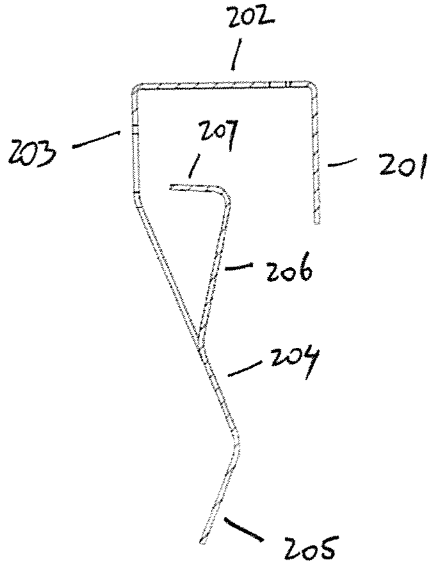
FIG. 54 shows a cross sectional side view of the clip shown in FIG. 53.

FIGS. 53 and 54 show an alternative clip for use in the present invention. The clip shown in FIGS. 53 and 54 is made from metal, such as steel sheet or spring steel sheet. The clip 200 has a rear wall 201, a flat upper surface 202 that, in use, sits above the rounded lip of the gutter, a downwardly extending inner region 203, a downwardly and outwardly extending intermediate region 204 and a downwardly and inwardly extending lower region 205. An outwardly and upwardly extending leg 206 is pressed out of leg regions 203 and 204 and an inwardly extending end region 207 is formed in leg 206. This gives a functional cross-sectional profile for the clip 200 that is similar to the functional cross-sectional profile of the clips 10 and 100. The upper surface 202 has an opening 208 formed therein. As the clip 200 is made from thin metal sheet, it can be inexpensively produced by press forming operations or by stamping.

Figure 55:
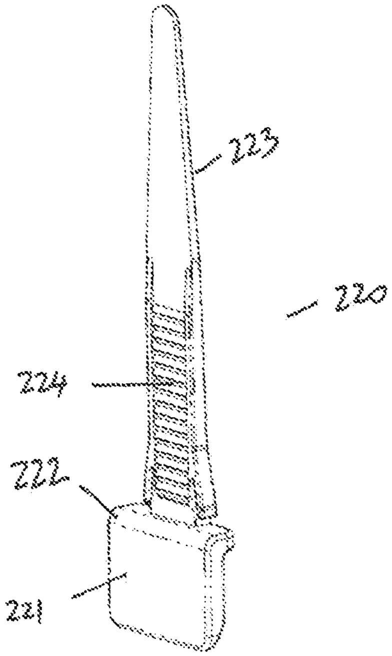
FIG. 55 shows a perspective view of projection used with the clip shown in FIG. 53.
Figure 56:
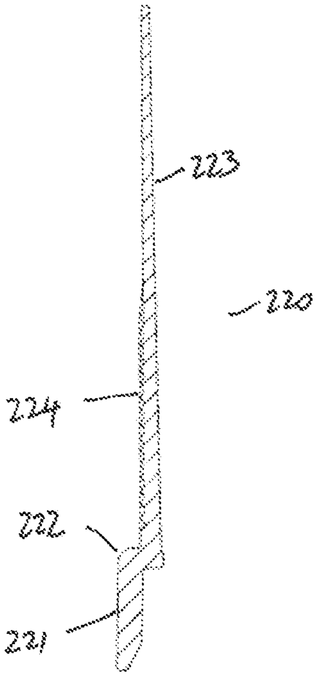
FIG. 56 shows a cross-sectional side view of the projection shown in FIG. 55.

FIGS. 55 and 56 show a projection 220 that can be used with the clip 200. The projection 220 may be moulded from a plastic material. The projection 220 has a lower body 221 having a shoulder 222. A projection 223 extends upwardly from the lower body and it is laterally spaced from shoulder 222. Teeth 224 are formed on projection 223.

Figure 57:
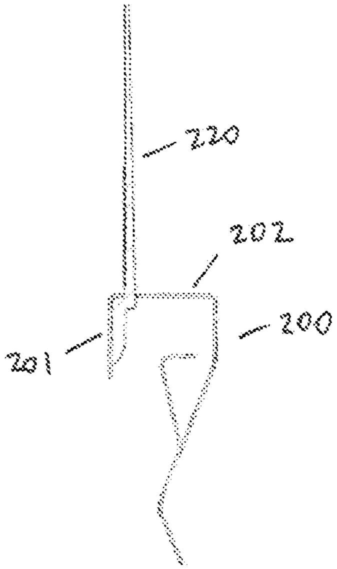
FIG. 57 shows a cross sectional side view of the clip and projection shown in FIGS. 53 to 56 being fitted together.
Figure 58:
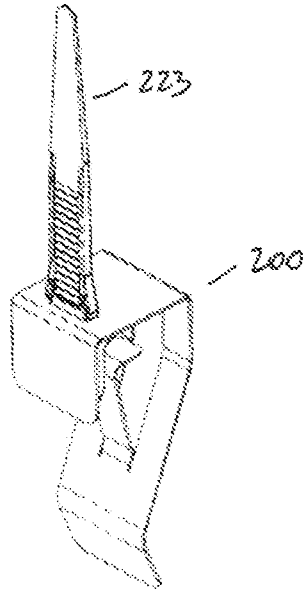
FIG. 58 shows a perspective view of the assembled clip and projection as shown in FIG. 57.

In use, the projection 220 is inserted upwardly through the opening 208 in the clip 200 until the shoulder 222 abuts against the corresponding corner formed between rear wall 201 and upper surface 202 of the clip 200. This is shown in FIGS. 57 and 58. The projection 200 may be held in place by adhesive or by snap fittings formed on the respective clip and projection (not shown). Alternatively, the projection 200 may simply be positioned as shown in FIGS. 57 and 58 and subsequently held in position by use of the retainer 25.

Figure 59:
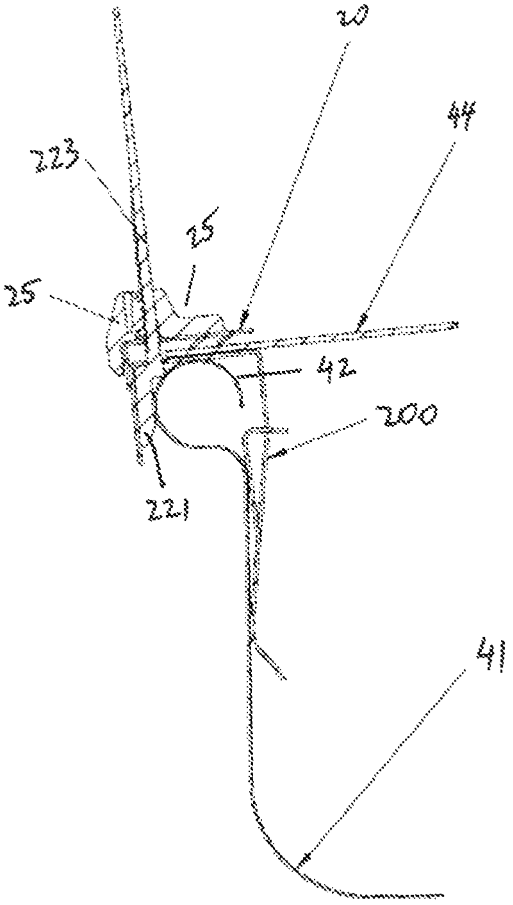
FIG. 59 shows a cross-sectional side view of gutter mesh being installed to an outer edge of the gutter using the clip and projection as shown in FIGS. 54 to 58.

The clip and projection as shown in FIGS. 53 to 58 may be used as a replacement for the clip 10 and fitting of the gutter mesh to the gutter may then be as described with reference to the embodiments shown in FIGS. 1 to 23. FIG. 59 shows a cross-sectional view of the gutter mesh being fitted using the clip 200 and projection 220. This view is essentially similar to that as shown with reference to FIG. 21 and like reference numerals will be used to describe like parts.

One advantage arising from using the clip 200 is that the clip 200 can be made from a significantly thinner material than the clip 10. As a result, the gutter mesh 44 sits much closer to the top of the rounded lip 42 of the gutter which, in turn, provides a neater fit and a closer fit of the gutter mesh to the gutter. Further, the clip 200 and projection 220 do not necessarily need to be affixed to each other, with the projection 220 able to be inserted through the opening 208 of the clip 200 just before positioning the clip 200 on the gutter. The juxtaposition of the clip on the gutter will then retain the projection in position and the retainer 25 will further retain the projection in position relative to the clip.

Figure 60:
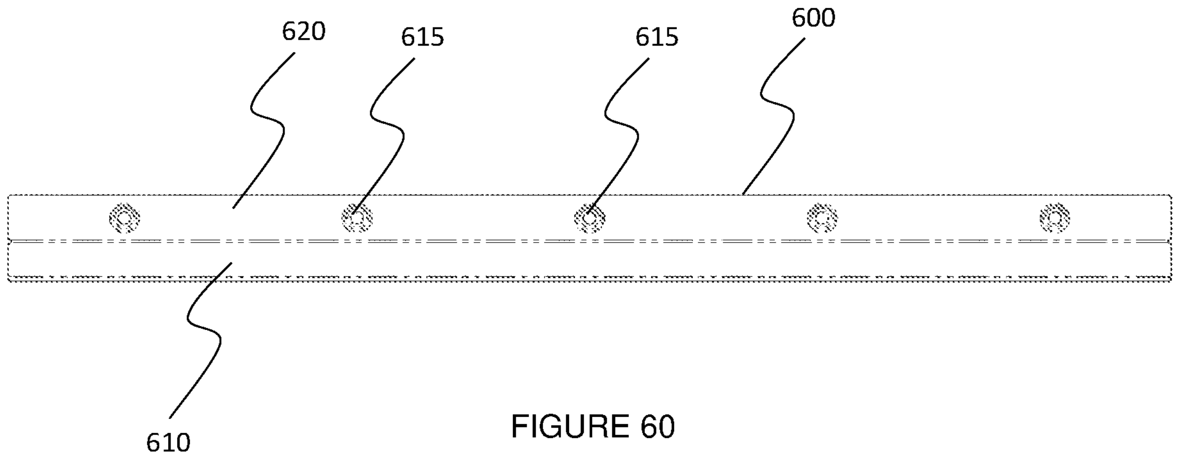
FIG. 60 shows a top view of an inner retainer with apertures, the inner retainer suitable for installation with a flat roof.
Figure 61:
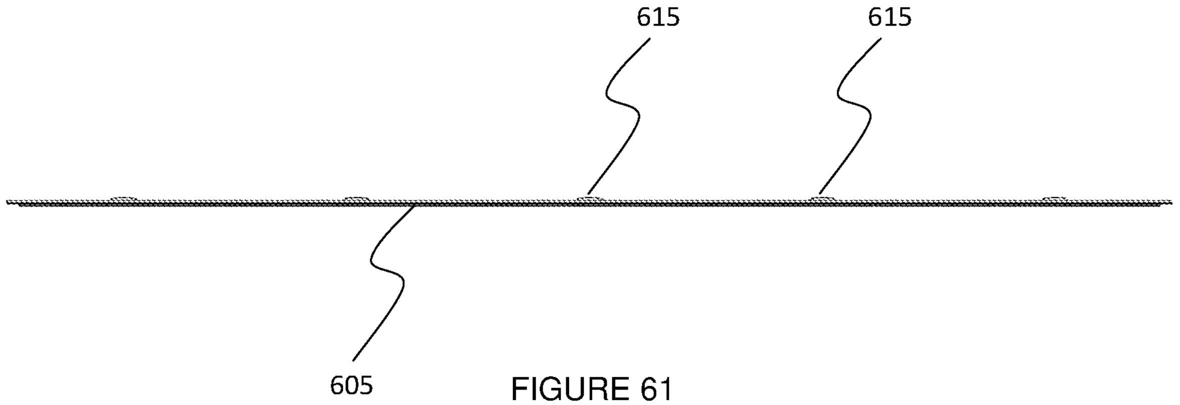
FIG. 61 shows a front view of the inner retainer shown in FIG. 60.
Figure 62:
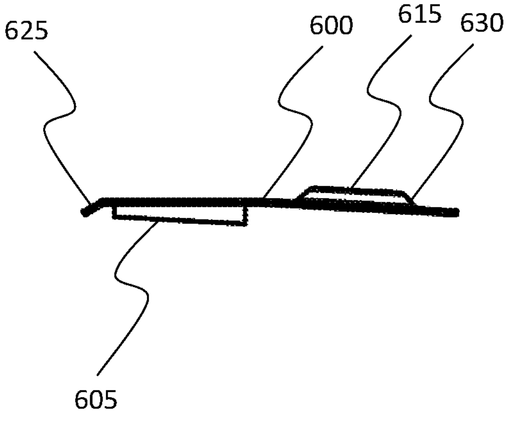
FIG. 62 shows an enlarged side view of the inner retainer shown in FIG. 60.

FIG. 60 shows a top view of an inner retainer 600 with apertures 615, the inner retainer 600 suitable for installation with a flat roof. FIG. 61 shows a front view of the inner retainer 600 shown in FIG. 60, and FIG. 62 shows an enlarged side view of the inner retainer 600 shown in FIG. 60. In yet another embodiment, the inner retainer 600 shown in FIGS. 60 to 67 comprises adhesive tape 605 on the underside of an inner region 610 and further comprises one or more apertures 615 on an outer region 620 of the inner retainer 600, the outer region 620 of the inner retainer 600 configured to be positioned over the inner region of the gutter mesh 645.

The one or more apertures 615 are sized to suit a nozzle 635 of a liquid adhesive source 640 for application of a liquid adhesive. Optionally, the liquid adhesive is selected from one of a silicone, polyurethane, sealant, or suitable liquid adhesive applied by a caulking gun, sealant gun, or suitable liquid adhesive applicator. The person skilled in the art will understand that the liquid adhesive can be a suitable adhesive in the broadest sense, and thus can be any adhesive which can be applied into the one or more apertures 615 by the use of a nozzle and works to seal and/or bond at least the roof 650, the gutter mesh 645, and the inner retainer 600.

As can be seen from FIG. 62, the inner retainer 600 may be profiled to accommodate the thickness of the adhesive strip 605, and further include an angled return 625 to mitigate any debris or deleterious material from entering under the inner retainer 600. FIG. 62 also shows a raised projection 630 on which the one or more aperture 615 is located. Optionally, the raised projection 630 is a frusto-conical shape with the aperture 615 centrally positioned. The raised projection 630 provides an internal cavity within which the liquid adhesive may gather, thus increasing the bond strength of the inner retainer 600.

Figure 63:
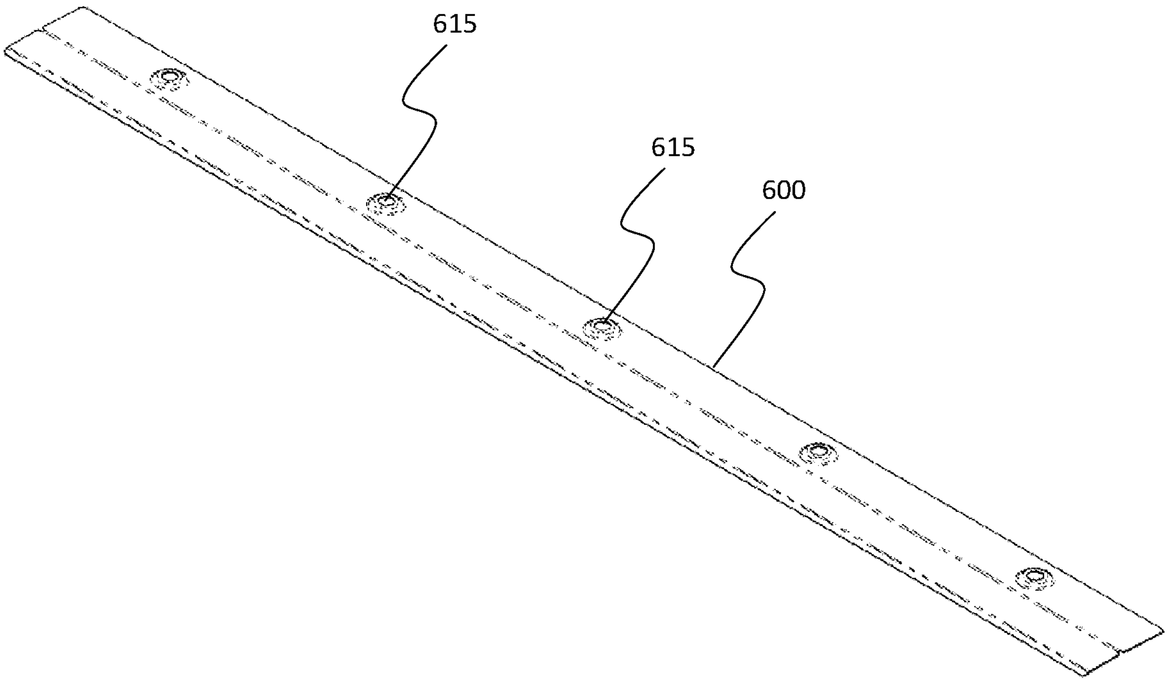
FIG. 63 shows a top perspective view of the inner retainer shown in FIG. 60.
Figure 64:
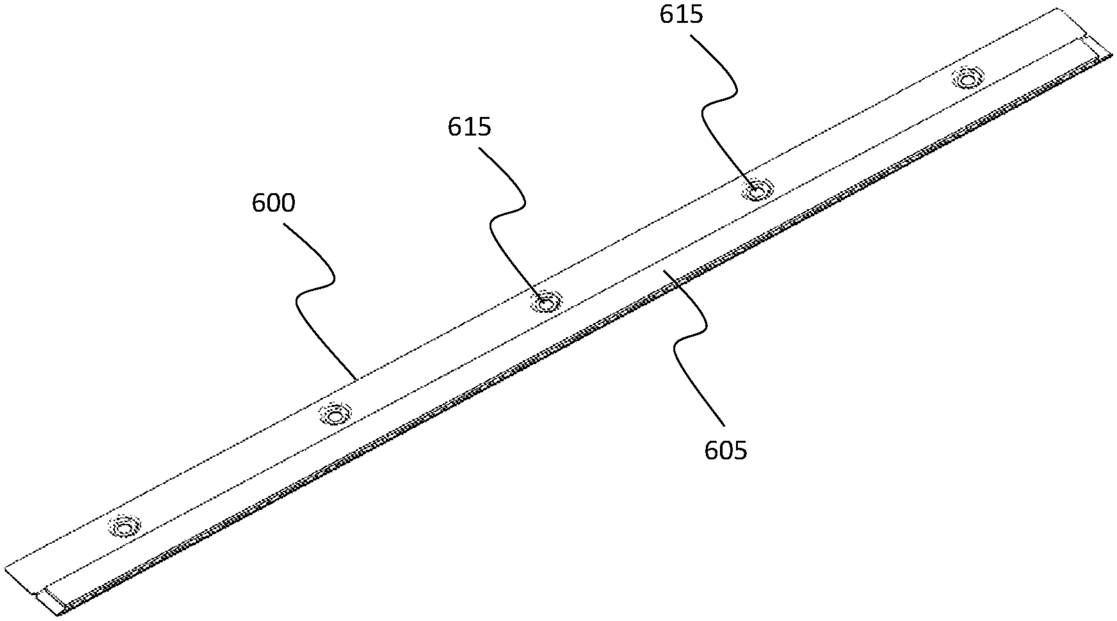
FIG. 64 shows a bottom perspective view of the inner retainer shown in FIG. 60.

FIG. 63 shows a top perspective view of the inner retainer 600 shown in FIG. 60, and FIG. 64 shows a bottom perspective view of the inner retainer 600 shown in FIG. 60. In one embodiment, the inner retainer 600 is a substantially flat bar shaped elongate member. The person skilled in the art will understand that such an embodiment is particularly suited for installation and engagement with a flat roof.

Figure 65:
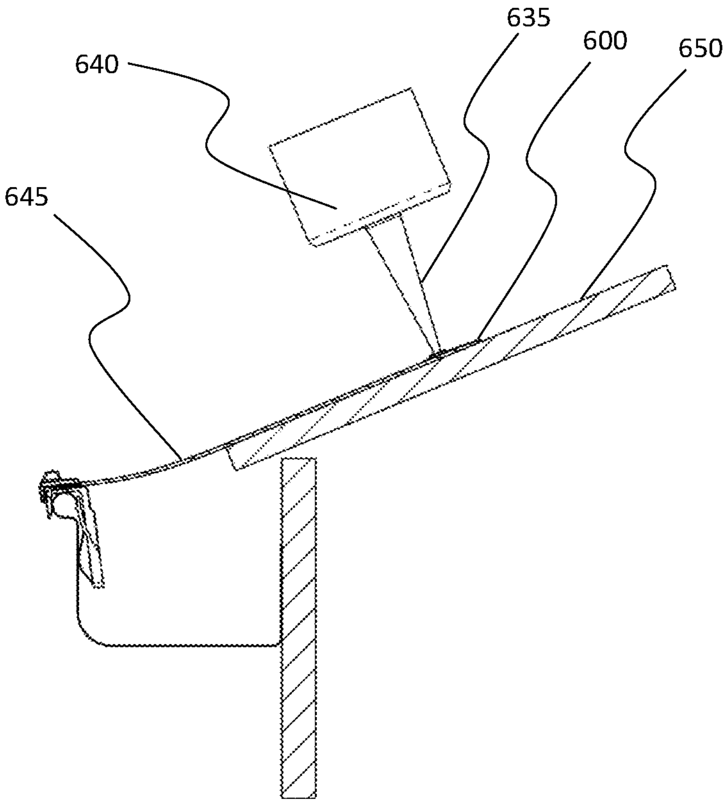
FIG. 65 shows a side section view of the installation of the inner retainer shown in FIG. 60.
Figure 66:
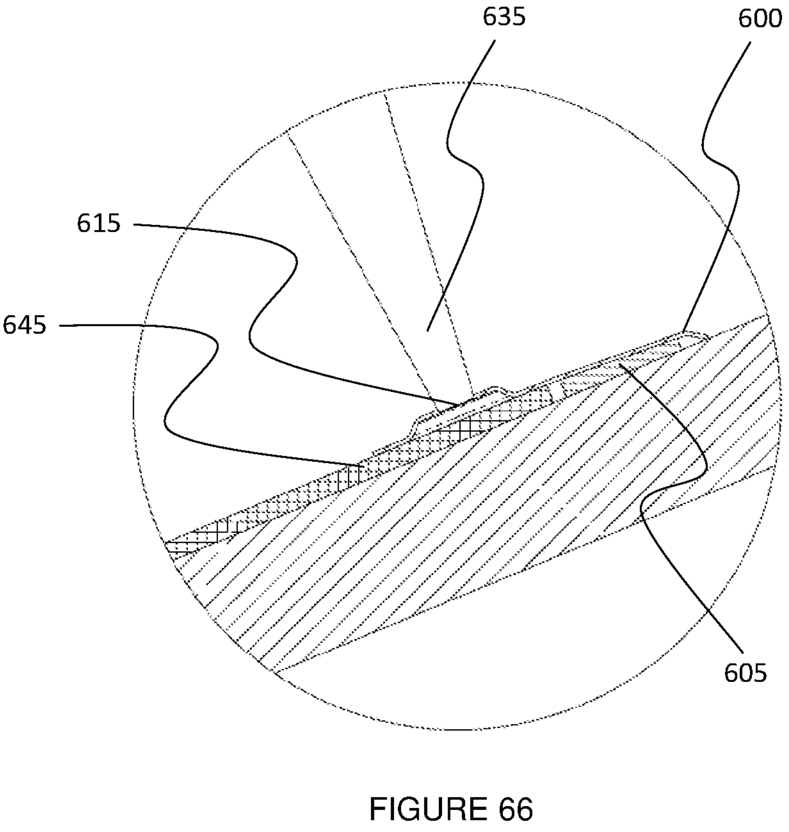
FIG. 66 shows a close-up view of the inner retainer installation as shown in FIG. 65.
Figure 67:
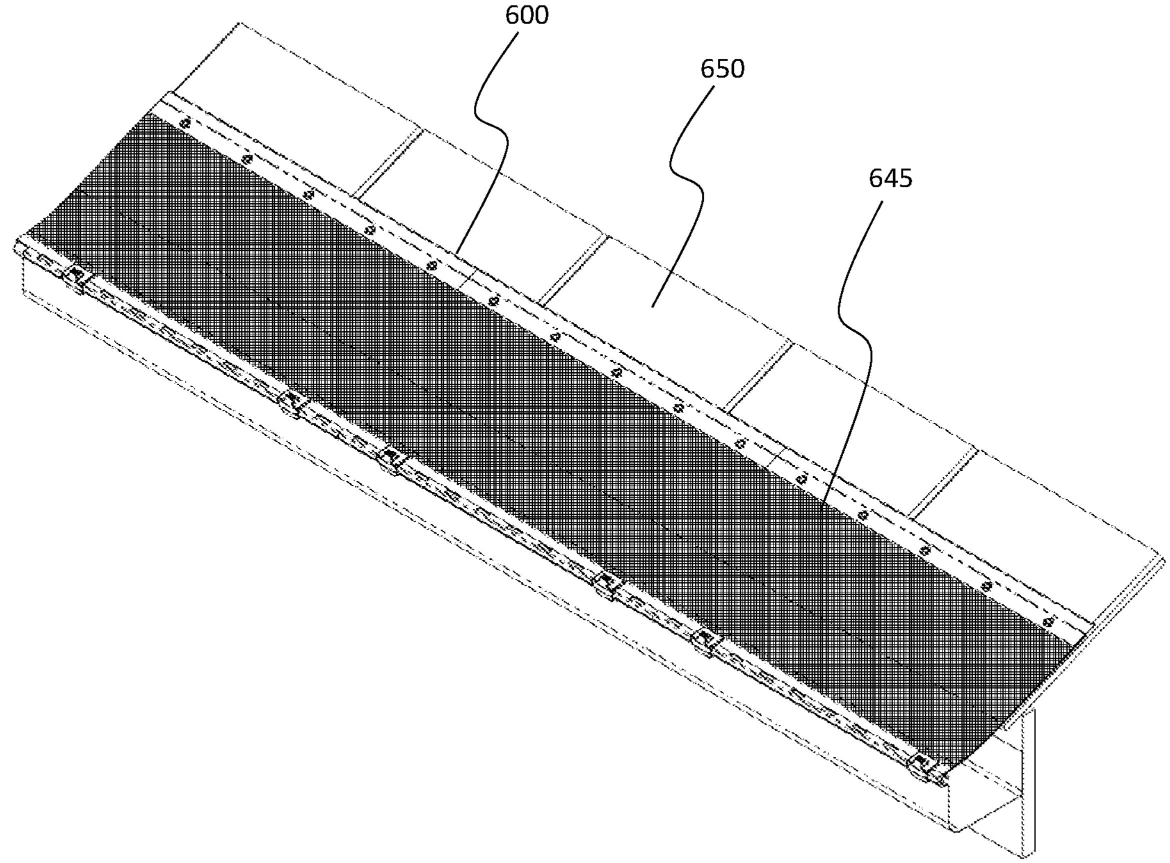
FIG. 67 shows a perspective view of an installed gutter mesh using the inner retainer shown in FIG. 60.

FIG. 65 shows a side section view of the installation of the inner retainer 600 shown in FIG. 60, and FIG. 66 shows a close-up view of the inner retainer 600 installation as shown in FIG. 65. The nozzle 635 may be sized to engage the aperture 615 for application of the liquid adhesive 640. The inner retainers 600 are thus further secured by application of a liquid adhesive 640 through the one or more apertures 615, wherein the liquid adhesive 640 permeates the gutter mesh 645 and provides a bond between the roof 650, the gutter mesh 645, and the inner retainer 600. FIG. 67 shows a perspective view of an installed gutter mesh 645 using the inner retainer 600 shown in FIG. 60.

Figure 68:
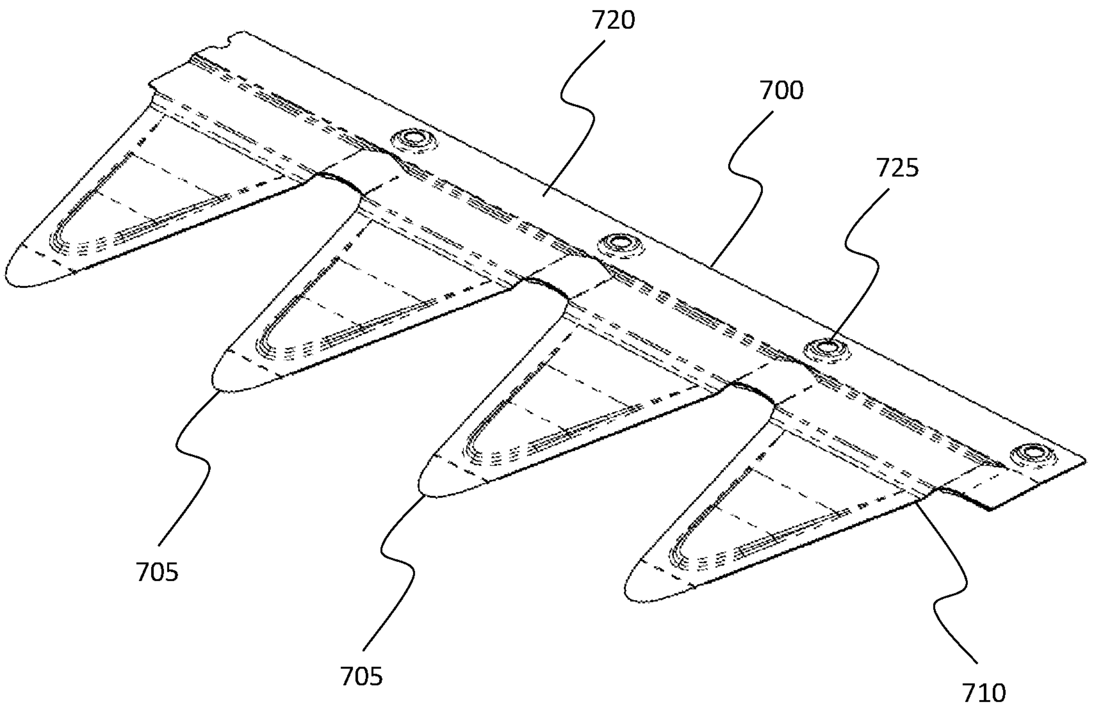
FIG. 68 shows a top perspective view of an inner retainer with apertures, the inner retainer suitable for installation with a corrugated roof.
Figure 69:
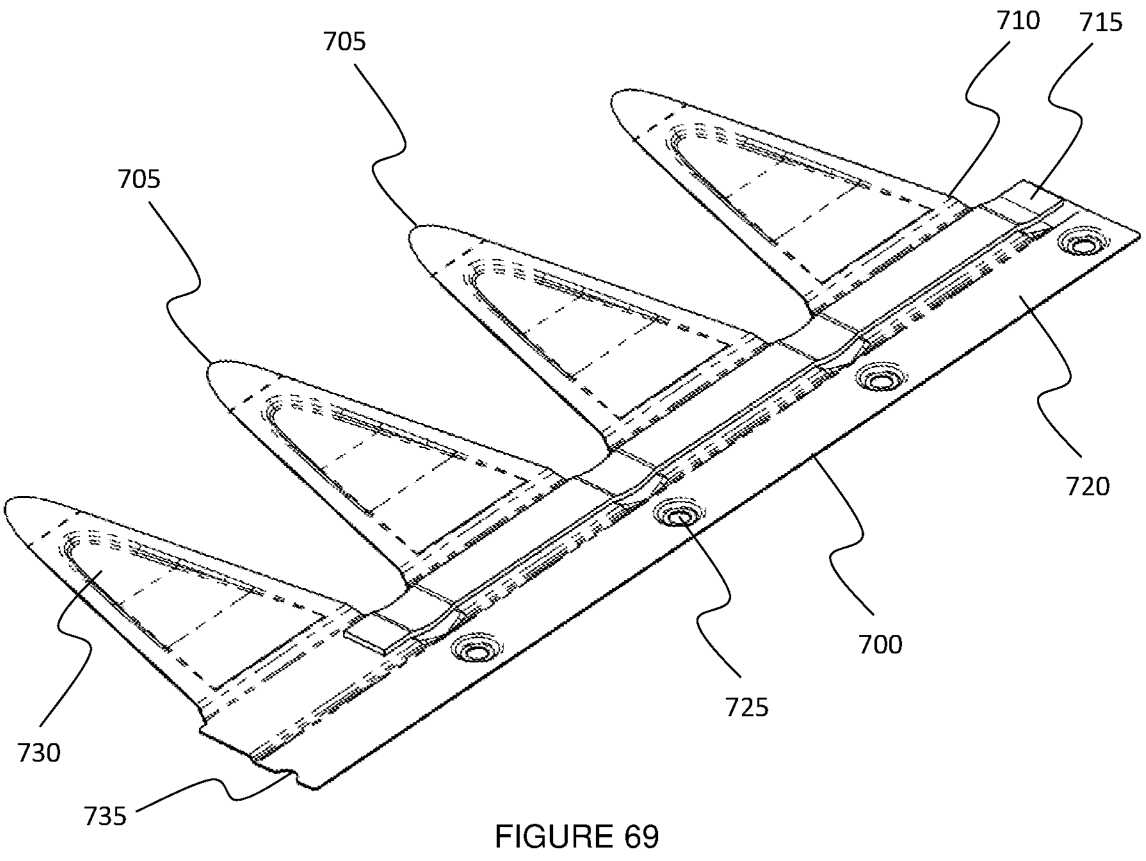
FIG. 69 shows a bottom perspective view of the inner retainer shown in FIG. 68.

FIG. 68 shows a top perspective view of an inner retainer 700 with apertures 725, the inner retainer 700 suitable for installation with a corrugated roof. FIG. 69 shows a bottom perspective view of the inner retainer 700 shown in FIG. 68. The embodiment of the inner retainer 700 shown in FIGS. 68 to 72 comprises a plurality of tooth shaped profiles 705 on the inner region 710 of the inner retainer 700. The plurality of tooth shaped profiles 705 are suitably shaped and configured to engage with the troughs of the corrugated roof

750. The inner retainer 700 comprises adhesive tape 715 positioned between the inner region 710 and the outer region 720, and further comprises one or more apertures 725 on the outer region 720 of the inner retainer 700, wherein the outer region 720 of the inner retainer 700 is configured to be positioned over the inner region of the gutter mesh 745. The plurality of tooth shaped profiles 705 are configured to interface with the troughs of the corrugated roof 750 and may be adjusted in depth and width to suit different corrugation and different interface angles with the roof. The person skilled in the art will understand that the plurality of tooth shaped profiles 705 may also take the form of ridges, flat ridges, scallops, and other shapes according to need, and may be altered according to roof type and shape.

The plurality of tooth shaped profiles 705 may each be further shaped to improve performance and rigidity. As shown in FIG. 69, the plurality of tooth shaped profiles 705 may further comprise embossed features 730 to improve strength and rigidity. Optionally, the inner retainer 700 may also further comprise a mating feature 735 configured to engage an adjacent inner retainer 700.

Figure 70:
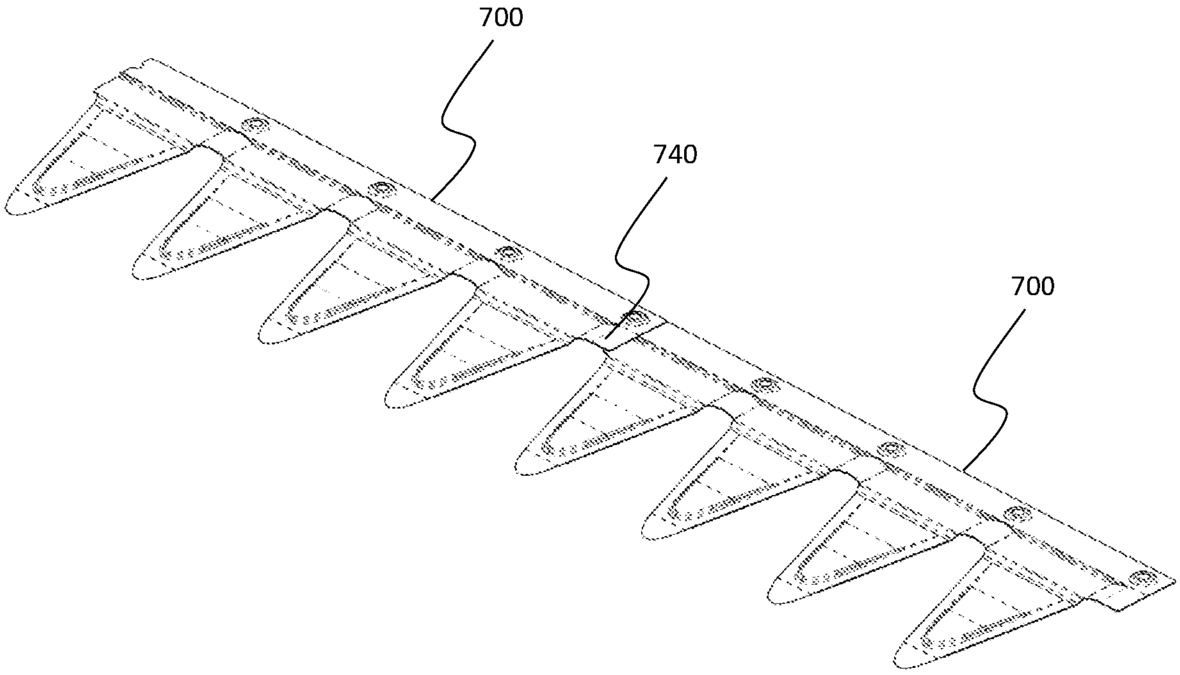
FIG. 70 shows a top perspective view of two inner retainers shown in FIG. 68 in a joined configuration.
Figure 71:
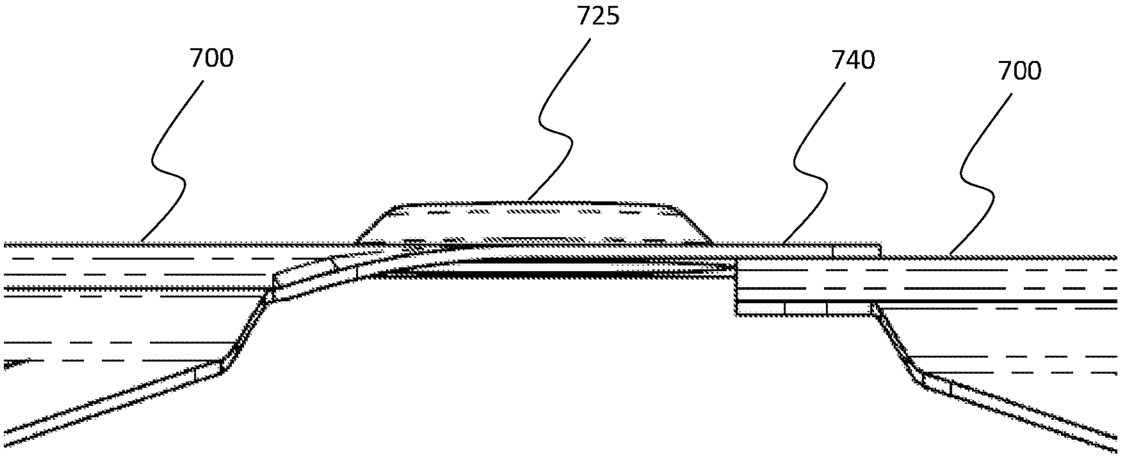
FIG. 71 shows a close-up view of the join between the two inner retainers shown in FIG. 70.

FIG. 70 shows a top perspective view of two inner retainers 700 shown in FIG. 68 in a joined configuration, and FIG. 71 shows a close-up view of the join between the two inner retainers 700 shown in FIG. 70. In a preferred embodiment, the inner retainer 700 comprises an overlapping member 740 configured to overlap an adjacent inner retainer 700. The overlapping member 740 may comprise the mating feature 735 and, optionally, the mating feature 735 is a scalloped cut-out shaped to engage or align with a corresponding aperture 725 on the adjacent inner retainer 700.

Figure 72:
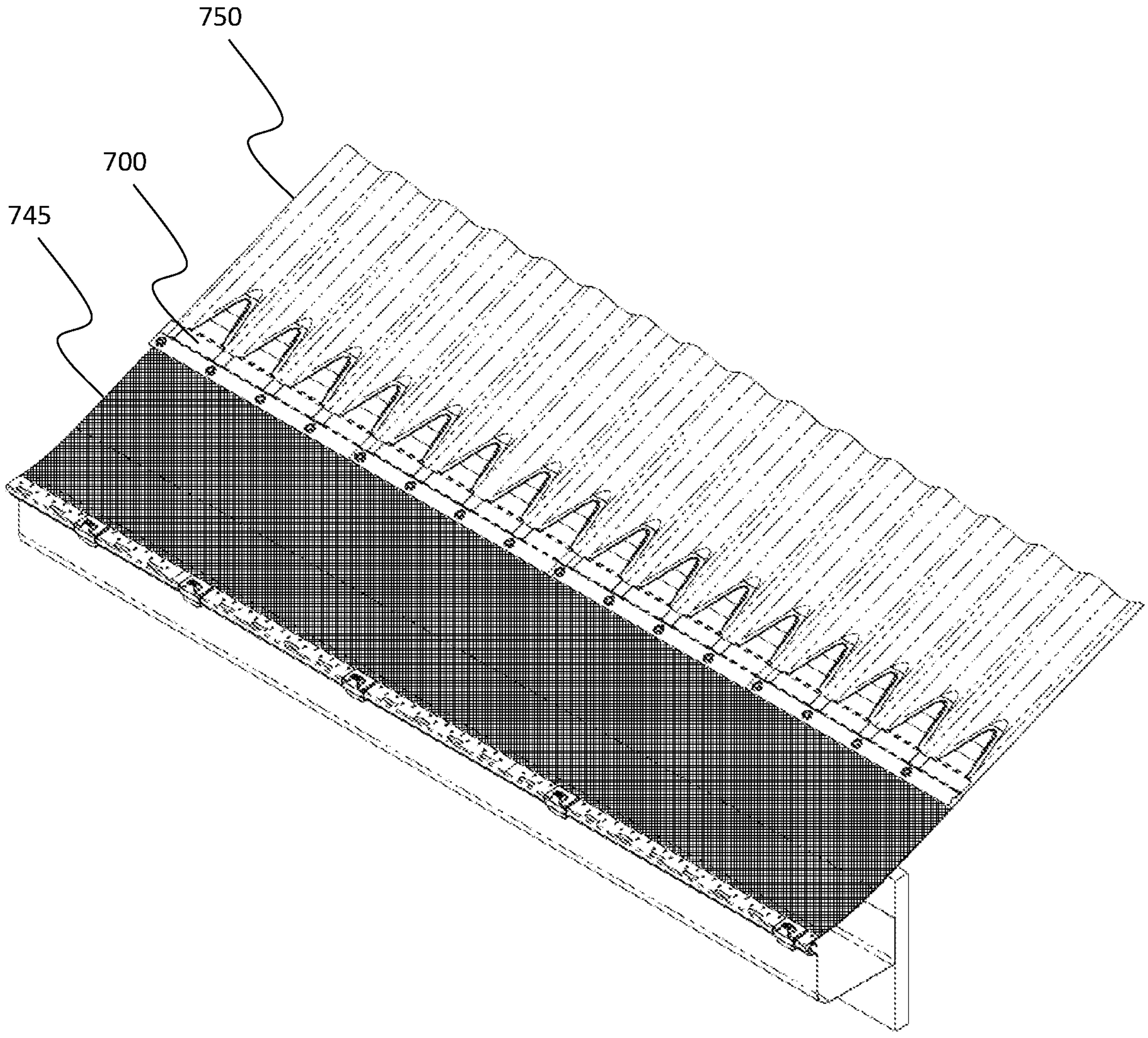
FIG. 72 shows a perspective view of an installed gutter mesh using the inner retainer shown in FIG. 68.

FIG. 72 shows a perspective view of an installed gutter mesh 745 using the inner retainer 700 shown in FIG. 68, wherein the inner retainers 700 are secured by application of a liquid adhesive through the one or more apertures 725, wherein the liquid adhesive permeates the gutter mesh 745 and provides a bond between the roof 750, the gutter mesh 745, and the inner retainer 700.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the. The abutment region 19 is formed by a projecting surface that extends beyond the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A method for installing a gutter mesh to a gutter of a roof, the gutter having an outer edge with a lip, the method comprising: locating one or more clips on the outer edge of the gutter, each of the one or more clips including a projection and a landing area for receiving part of the gutter mesh, a plurality of legs to be positioned on an inside part of the gutter outer edge and/or a downwardly extending outer wall to be positioned externally to the lip of the gutter and abut the lip of the gutter when the clip is fitted to the gutter, placing the gutter mesh such that parts of the gutter mesh overlie the landing areas of the one or more clips and an inner part of the gutter mesh overlies part of the roof, placing at least one retainer over one or more of the one or more clips, and applying an inner retainer to fix an inner part of the gutter mesh to the roof.

2. The method of claim 1, wherein the projection of the clip passes through an aperture in the mesh when the gutter mesh is fitted to the clip such that parts of the gutter mesh overlie the landing areas, or an outer edge of the gutter mesh abuts against the projection when the gutter mesh is fitted to the clip such that parts of the gutter mesh overlie the landing areas.

3. The method of claim 1, wherein the one or more clips is attached to the gutter edge by being pushed onto the edge of the gutter.

4. The method of claim 1, wherein the one or more clips is slid along the gutter to position the clip on the gutter.

5. The method of claim 1, wherein the at least one retainer is an elongated strip having a plurality of apertures and the strip is positioned so that one or more of the apertures are aligned with one or more of the projections of the one or more clips and the one or more projections are inserted through the one or more apertures of the strip.

6. The method of claim 5, wherein the elongated strip retains the outer region of the gutter mesh in position.

7. The method of claim 1, wherein the at least one retainer is a body having an opening that fits over the projection of the clip and is retained on the projection.

8. The method of claim 1, wherein the inner retainer comprises an adhesive tape and the adhesive tape is applied to the inner edge of the gutter mesh, the adhesive extending through openings in the gutter mesh and adheres to the roof underlying the inner edge of the gutter mesh.

9. The method of claim 1, wherein the inner retainer comprises an adhesive tape on an inner region and the adhesive tape affixes the inner region of the inner retainer to the roof.

10. The method of claim 9, wherein a nozzle of a liquid adhesive source is fitted in one or more apertures on an outer region of the inner retainer and a liquid adhesive is applied through the one or more apertures on the outer region.

11. The method of claim 10, wherein the liquid adhesive permeates the gutter mesh, bonding the roof, the gutter mesh, and the inner retainer.

12. A system for installing a gutter mesh to a gutter of a roof, the gutter having an outer edge with a lip, the system comprising a plurality of clips for fitting to the outer edge of the gutter, each of the clips including a projection, a landing area for receiving part of the gutter mesh, and a plurality of legs configured to be positioned on an inside part of the gutter outer edge and/or a downwardly extending outer wall configured to be positioned externally to the lip of the gutter and abut the lip of the gutter when the clip is fitted to the gutter, and at least one retainer for positioning over the clip, and one or more inner retainers to fix an inner part of the gutter mesh to the roof.

13. The system of claim 12, wherein the at least one retainer is an elongated strip having a plurality of apertures and the strip is positioned so that one or more of the apertures are aligned with one or more of the projections of the one or more clips and the one or more projections are inserted through the one or more apertures of the strip.

14. The system of claim 12, wherein the landing area is a flat region located inwardly or both inwardly and outwardly of the projection of the clip, and/or the landing area comprises one or more barbs that engage with openings on the gutter mesh.

15. The system of claim 12, wherein the projection further comprises one or more teeth or serrations for engagement with one or more teeth or serrations on the retainers.

16. The system of claim 12, wherein the one or more inner retainers comprise an adhesive strip for affixing the inner retainer to the roof, and/or wherein the one or more inner retainers comprise one or more apertures sized to suit a nozzle of a liquid adhesive source for application of a liquid adhesive, wherein the liquid adhesive permeates the gutter mesh and provides a bond between the roof, the gutter mesh, and the inner retainer.

17. The system of claim 16, wherein the one or more apertures is located on an outer region of the inner retainer, and/or the one or more apertures comprises a raised projection on which the one or more aperture is located.

18. The system of claim 12, wherein the inner retainer comprises a plurality of tooth shaped profiles configured to engage with troughs of a corrugated roof.

19. The system of claim 16, wherein the liquid adhesive is one of a silicone, polyurethane, sealant, or liquid adhesive.

20. The system of claim 12, wherein each retainer comprises a body having an opening that fits over the projection of one of the clips and is retained on the projection.

* * * * *